(12) United States Patent
Tsuiki et al.

(10) Patent No.: US 10,594,195 B2
(45) Date of Patent: Mar. 17, 2020

(54) MANUFACTURING METHOD FOR STATOR WINDING COIL

(71) Applicant: Mitsubishi Electric Corporation, Chiyoda-ku, Tokyo (JP)

(72) Inventors: Hironori Tsuiki, Tokyo (JP); Tatsuro Hino, Tokyo (JP); Atsushi Sakaue, Tokyo (JP); Kazunori Muto, Tokyo (JP); Hiroyuki Yasuda, Tokyo (JP); Kohei Egashira, Tokyo (JP); Akira Hashimoto, Tokyo (JP); Hiroyuki Akita, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 724 days.

(21) Appl. No.: 15/111,325

(22) PCT Filed: Nov. 14, 2014

(86) PCT No.: PCT/JP2014/080248
§ 371 (c)(1),
(2) Date: Jul. 13, 2016

(87) PCT Pub. No.: WO2015/111287
PCT Pub. Date: Jul. 30, 2015

(65) Prior Publication Data
US 2016/0372992 A1 Dec. 22, 2016

(30) Foreign Application Priority Data

Jan. 23, 2014 (JP) ................... 2014-010110

(51) Int. Cl.
*H02K 15/04* (2006.01)
*H02K 3/12* (2006.01)
*H02K 1/16* (2006.01)

(52) U.S. Cl.
CPC ........... *H02K 15/0421* (2013.01); *H02K 1/16* (2013.01); *H02K 3/12* (2013.01); *H02K 15/045* (2013.01); *H02K 2213/03* (2013.01)

(58) Field of Classification Search
CPC .... H02K 15/0421; H02K 15/045; H02K 1/16; H02K 2213/03; H02K 3/12
See application file for complete search history.

(56) References Cited

U.S. PATENT DOCUMENTS 8,294,324 B2 * 10/2012 Ishigami ................. H02K 3/12
310/206
9,680,358 B2 * 6/2017 Tsuiki ...................... H02K 3/12
(Continued)

FOREIGN PATENT DOCUMENTS

CN 1704184 A 12/2005
EP 1 602 418 A2 12/2005
(Continued)

OTHER PUBLICATIONS

English language version of Office Action dated Nov. 16, 2017, issued by the Chinese Patent Office in the corresponding Chinese Patent Application No. 201480073842.8. (7 pages).
(Continued)

*Primary Examiner* — Minh N Trinh
(74) *Attorney, Agent, or Firm* — Buchanan Ingersoll & Rooney PC

(57) ABSTRACT

A manufacturing method for a stator winding coil includes: a bulging portion forming step that forms a bulging portion on a conductor wire; a crank portion forming step that forms a crank portion on the central portion of the bulging portion; an oblique portion forming step that forms oblique portions on the conductor wire at two ends of the bulging portion; a rectilinear portion forming step that forms rectilinear portions on the conductor wire at opposite ends of the oblique portions from the bulging portion; and a circular arc forming (Continued)

step that forms the oblique portions into a circular arc shape after forming the rectilinear portions.

2 Claims, 22 Drawing Sheets

(56) References Cited

U.S. PATENT DOCUMENTS

| | | | |
|---|---|---|---|
| 9,793,774 B2* | 10/2017 | Yokota | H02K 3/34 |
| 2008/0093948 A1 | 4/2008 | Naganawa | |
| 2016/0372992 A1* | 12/2016 | Tsuiki | H02K 1/16 |

FOREIGN PATENT DOCUMENTS

| | | |
|---|---|---|
| JP | 51-118001 A | 10/1976 |
| JP | 62-89454 A | 4/1987 |
| JP | 2010-259314 A | 11/2010 |
| JP | 2011-147292 A | 7/2011 |
| JP | 2014-135857 A | 7/2014 |
| WO | WO 2014/065026 A1 | 5/2014 |

OTHER PUBLICATIONS

International Search Report (PCT/ISA/210) dated Jan. 20, 2015, by the Japanese Patent Office as the International Searching Authority for International Application No. PCT/JP2014/080248.
Written Opinion (PCT/ISA/237) dated Jan. 20, 2015, by the Japanese Patent Office as the International Searching Authority for International Application No. PCT/JP2014/080248.

* cited by examiner

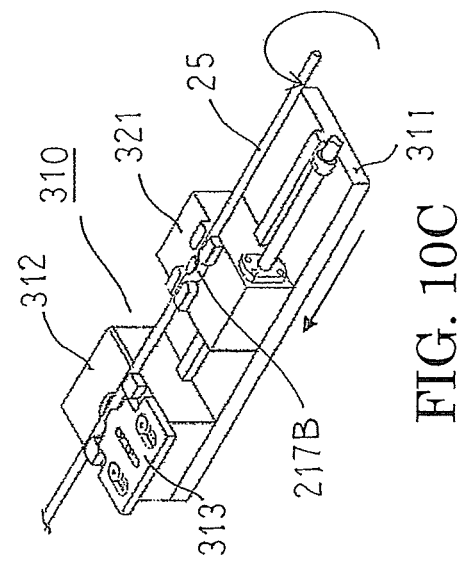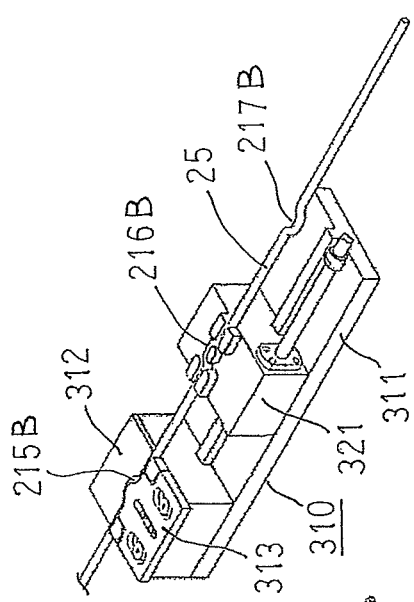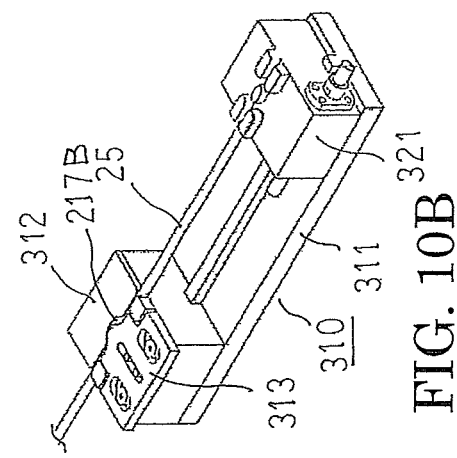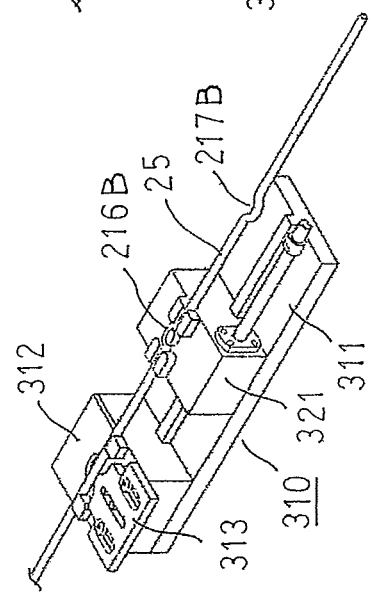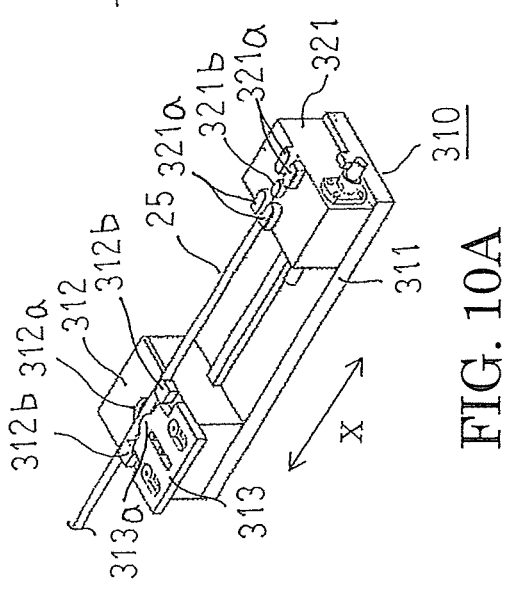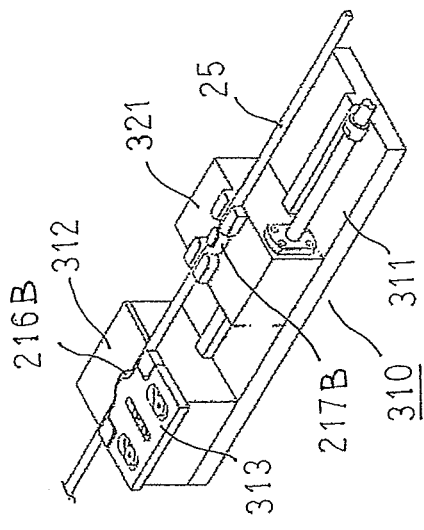

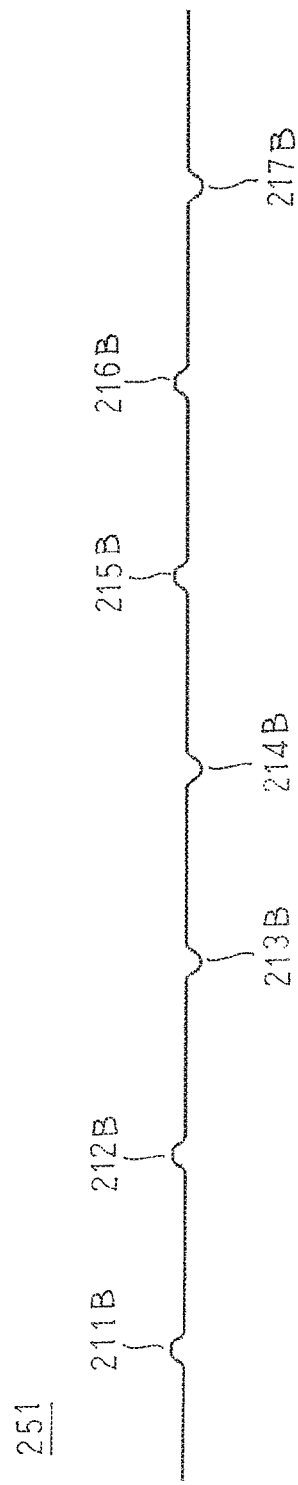

FIG. 12
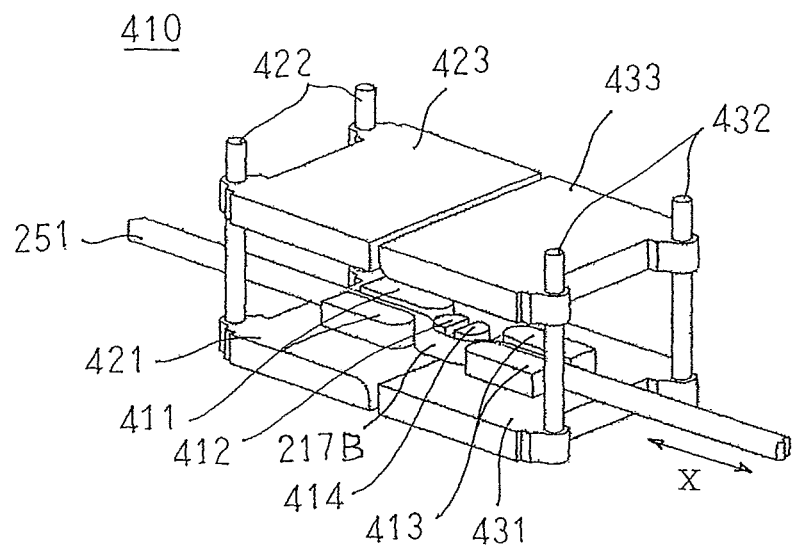
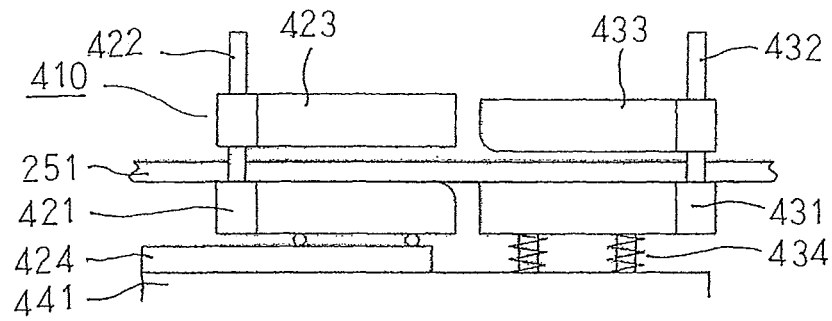
FIG. 13A
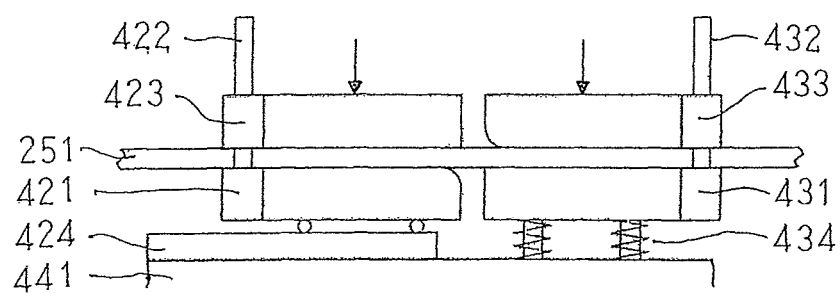
FIG. 13B
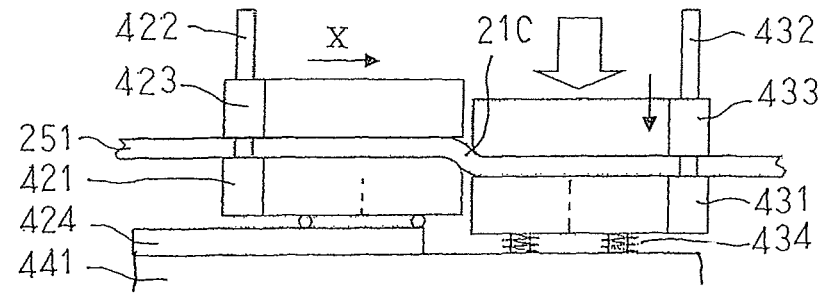
FIG. 13C

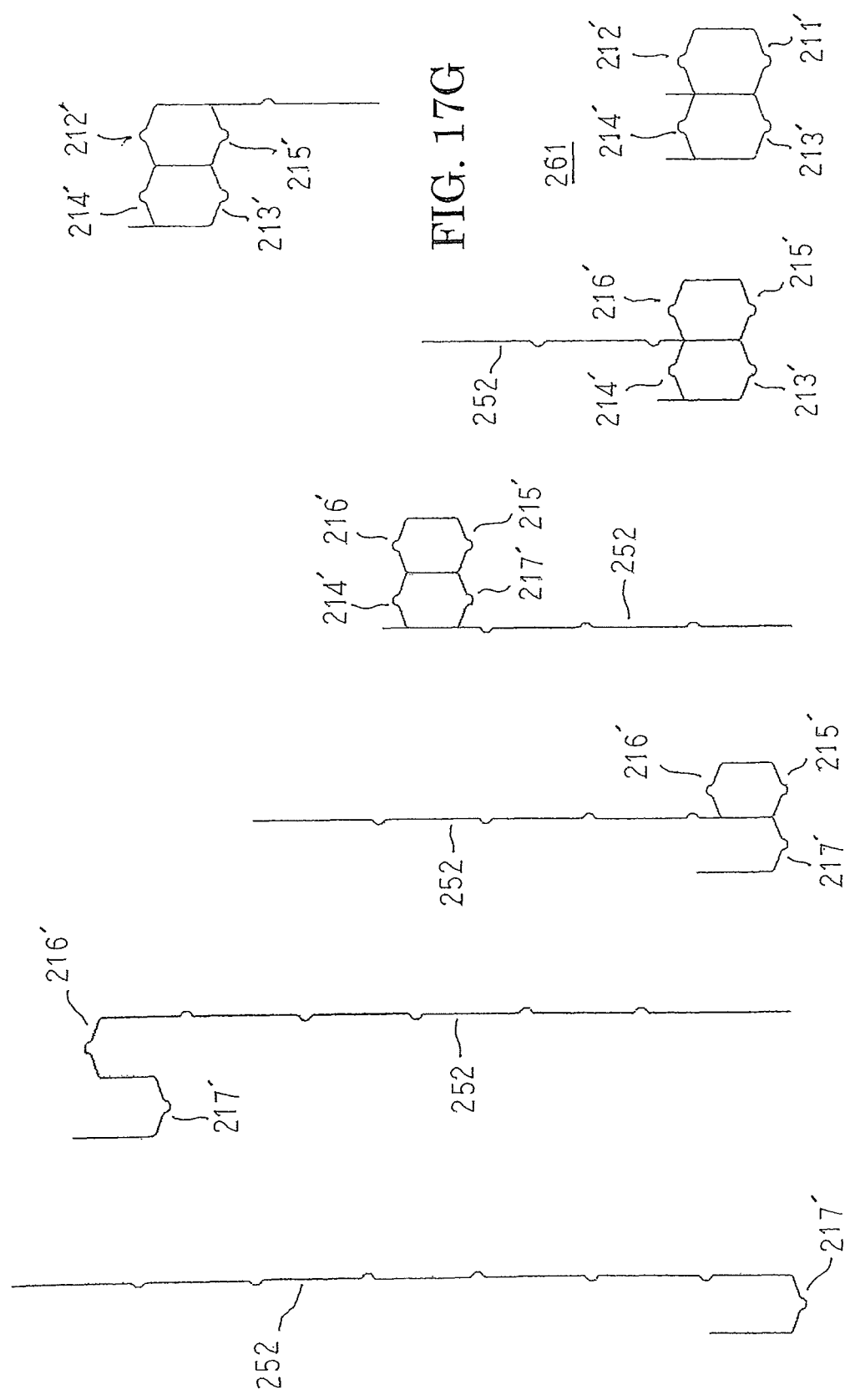

MANUFACTURING METHOD FOR STATOR WINDING COIL

TECHNICAL FIELD

The present invention relates to a manufacturing method for a stator winding coil that is used in a rotary electric machine such as an electric motor or a generator.

BACKGROUND ART

In recent years, compactness, high output, and increased efficiency have been required in rotary electric machines such as electric motors or generators. With regard to downsizing rotary electric machines of this kind, stator windings that have concentrated windings in which conductor wires are wound onto individual stator core teeth have been used with a view to downsizing coil ends, which do not generate effective magnetic flux. However, stators that use distributed winding stator windings are in demand because increases in output are possible using distributed winding stator windings compared to concentrated winding stator windings.

Excitation currents are also becoming larger with increases in output. In order to cope with larger excitation currents, there is a tendency to use conductor that have a large cross-sectional area and conductor wires that have a rectangular cross section, and there is demand to manufacture coils so as to machine such conductor wires, which have higher rigidity, accurately and without damaging insulating coatings that are coated onto the conductor wires.

Here, in contrast to concentrated windings, which are configured by winding conductor wires onto individual teeth, windings that are configured by winding conductor wires into slots that are separated by two or more slots are called "distributed windings".

In Patent Literature 1, coil end portions that connect rectilinear portions together with rectilinear portions that are housed in different slots circumferentially are formed on a conductor wire, and then the conductor wires on which the rectilinear portions and the coil end portions are formed are wound onto a cylindrical inner pressing member with displacement of the rectilinear portions restricted, and then a pressing member is pressed onto the coil end portions from radially outside, to form crank portions on the coil end portions, and also to form the coil end portions to a set curvature.

CITATION LIST

Patent Literature

Patent Literature 1: Japanese Patent Laid-Open No. 2011-147292 (Gazette)

SUMMARY OF THE INVENTION

Problem to be Solved by the Invention

In Patent Literature 1, because the conductor wires are wound onto a cylindrical inner pressing member with displacement of the rectilinear portions restricted, and then a pressing member is pressed onto the coil end portions from radially outside, one problem has been that the apparatus is complicated, increasing manufacturing costs. Because the crank portions and oblique portions that have a set curvature are formed simultaneously on conductor wires that have great rigidity, another problem has been that large machining forces are required for the shaping, making apparatuses bulky, and increasing manufacturing costs, and also increasing the risk that insulating coatings that are coated onto the conductor wires may be damaged.

The present invention aims to solve the above problems and an object of the present invention is to provide a manufacturing method for a stator winding coil that can reduce manufacturing equipment costs, and that can also suppress the occurrence of damage to an insulating coating that is coated onto a conductor wire by forming a bulging portion, oblique portions, rectilinear portions, a crank portion, and curvature of oblique portions in respective dedicated steps, to reduce machining forces in each of the steps, and to enable simplification and reductions in size of forming equipment.

Means for Solving the Problem

A manufacturing method for a stator winding coil according to the present invention includes: $2m$ rectilinear portions that are inserted into a plurality of slots that are formed on a stator core such that longitudinal directions thereof are oriented in an axial direction, where $m$ is an integer that is greater than or equal to two; and $(2m-1)$ coil end portions that link the $2m$ rectilinear portions consecutively by each linking together end portions of two selected rectilinear portions among the $2m$ rectilinear portions, each of the coil end portions including: a bulging portion that is formed at a central portion between the two linked rectilinear portions so as to protrude axially outside the stator core; and a pair of oblique portions that link the two linked rectilinear portions and the bulging portion, the bulging portion having a crank portion that displaces radial positions of the two linked rectilinear portions by a set amount at the central portion, and each of the pair of oblique portions being formed into a circular arc shape that is centered around a central axis of the stator core, wherein the manufacturing method includes: a bulging portion forming step that forms the bulging portion on a jointless continuous conductor wire that is coated with insulation; a crank portion forming step that forms the crank portion on the central portion of the bulging portion; an oblique portion forming step that forms the oblique portions on the conductor wire at two longitudinal ends of the bulging portion; a rectilinear portion forming step that forms the rectilinear portions on the conductor wire at opposite ends of the oblique portions from the bulging portion; and a circular arc forming step that forms the oblique portions into the circular arc shape after forming the rectilinear portions.

Effects of the Invention

According to the present invention, because the bulging portion, the crank portion, the oblique portions, the rectilinear portions, and the circular arcs of the oblique portions are shaped in dedicated steps, machining force in each of the steps is reduced. Thus, the configuration of each of the forming machines can be simplified, and can also be reduced in size, enabling reductions in manufacturing equipment costs to be achieved. In addition, the occurrence of damage to the insulating coating that is coated on the conductor wire can be suppressed.

BRIEF DESCRIPTION OF THE DRAWINGS

FIGS. 10A through 10F show process diagrams that explain a bulging portion forming step in the manufacturing method for the stator winding coil that is used in the rotary electric machine according to Embodiment 1 of the present invention;

FIG. 11 is a schematic diagram that shows a conductor wire on which bulging portions have been formed in the manufacturing method for the stator winding coil that is used in the rotary electric machine according to Embodiment 1 of the present invention;

FIG. 12 is an oblique projection that shows a crank portion forming apparatus in the manufacturing method for the stator winding coil that is used in the rotary electric machine according to Embodiment 1 of the present invention;

FIGS. 13A through 13C show process diagrams that explain a crank portion forming step in the manufacturing method for the stator winding coil that is used in the rotary electric machine according to Embodiment 1 of the present invention;

FIGS. 17A through 17G show schematic diagrams that show the oblique portion and rectilinear portion forming step in the manufacturing method for the stator winding coil that is used in the rotary electric machine according to Embodiment 1 of the present invention;

DESCRIPTION OF EMBODIMENTS

Preferred embodiments of a manufacturing method for a stator winding coil according to the present invention will now be explained with reference to the drawings.
Embodiment 1

Figure 1:
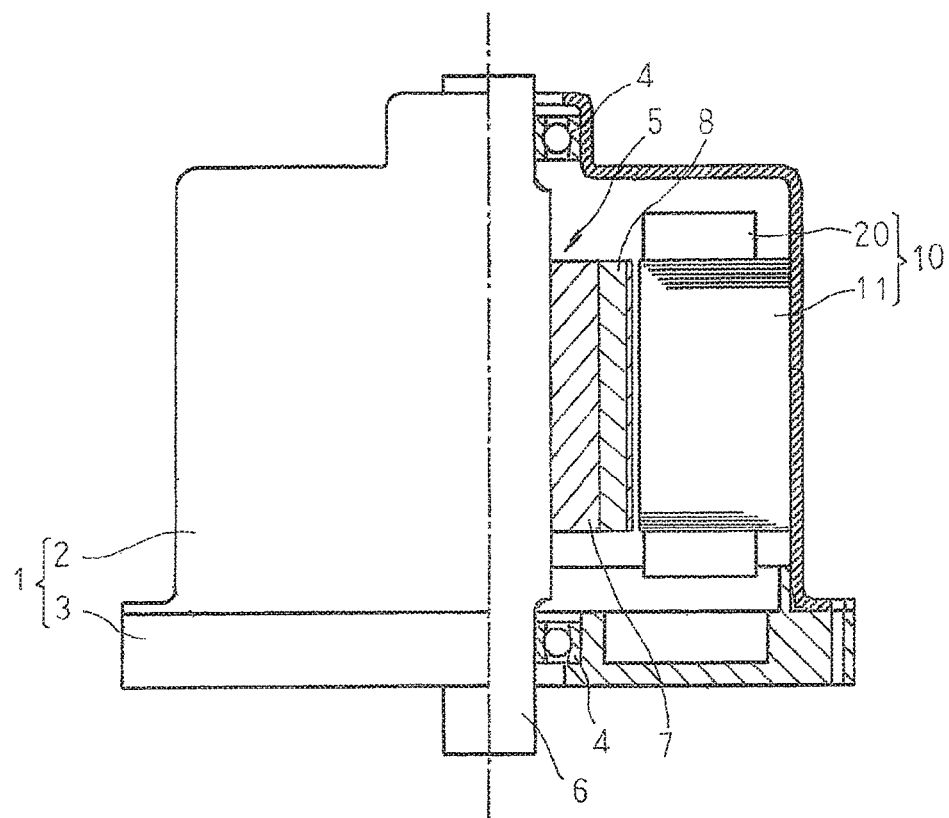
FIG. 1 is a half section that shows a rotary electric machine according to Embodiment 1 of the present invention.
Figure 2:
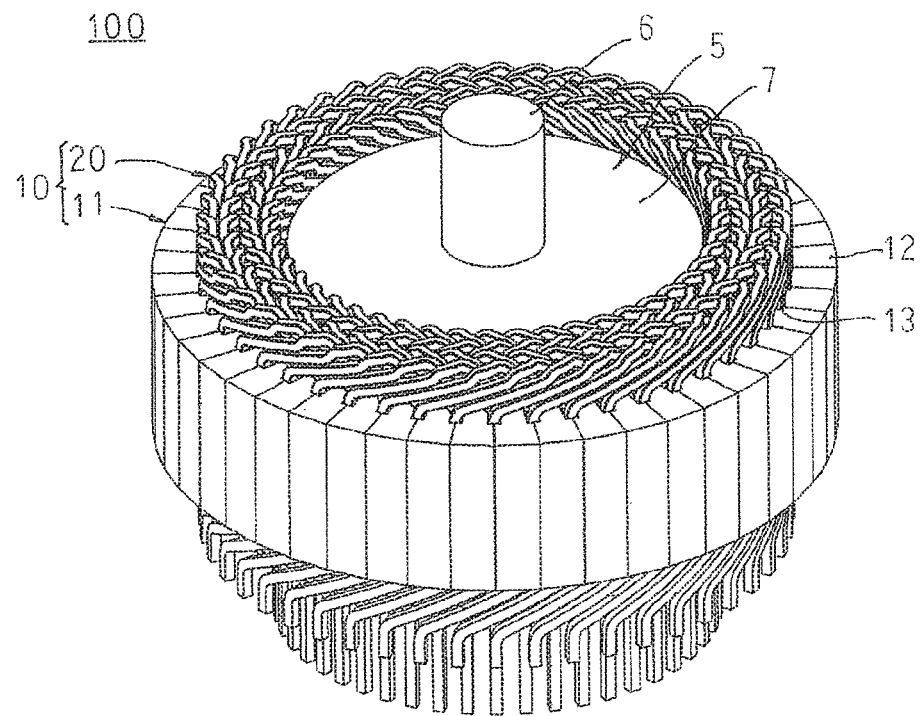
FIG. 2 is an oblique projection that shows part of the rotary electric machine according to Embodiment 1 of the present invention.
Figure 3:
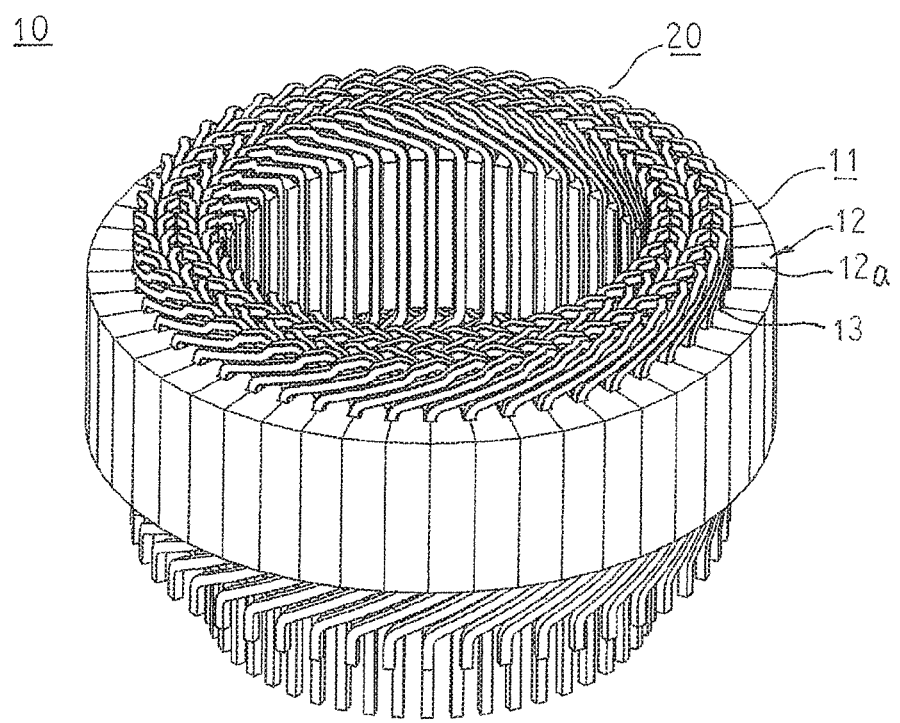
FIG. 3 is an oblique projection that shows a stator in the rotary electric machine according to Embodiment 1 of the present invention.
Figure 4:
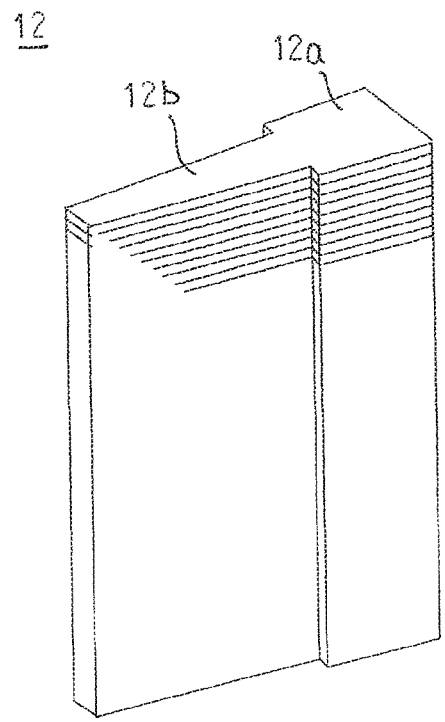
FIG. 4 is an oblique projection that shows a core block that constitutes part of a stator in the rotary electric machine according to Embodiment 1 of the present invention.
Figure 5:
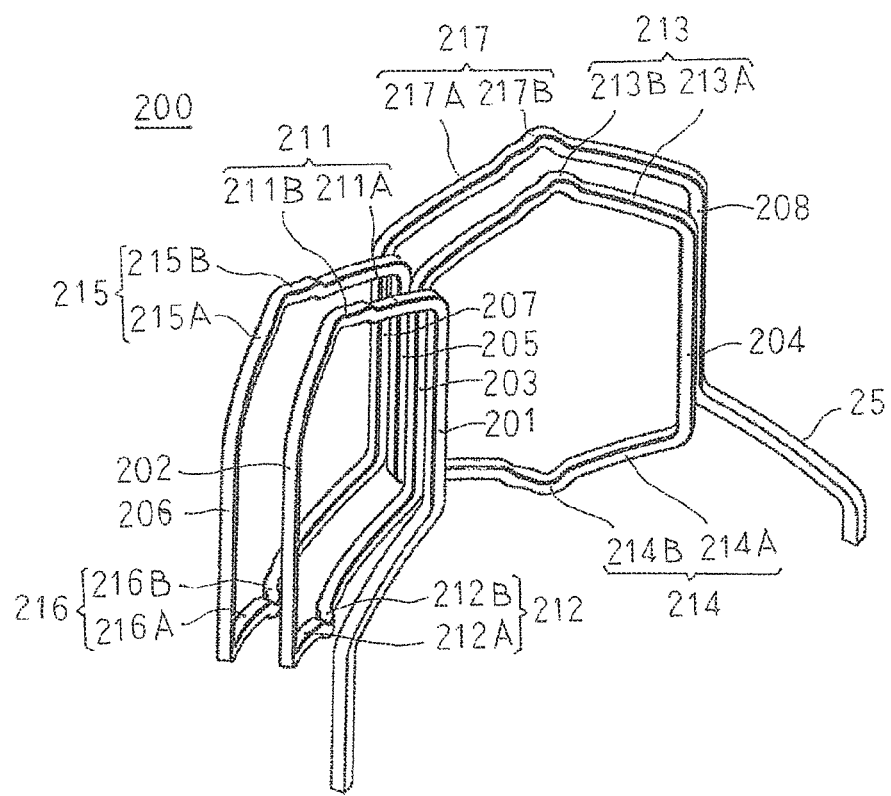
FIG. 5 is an oblique projection that shows a coil that constitutes part of a stator winding in the rotary electric machine according to Embodiment 1 of the present invention.
Figure 6:
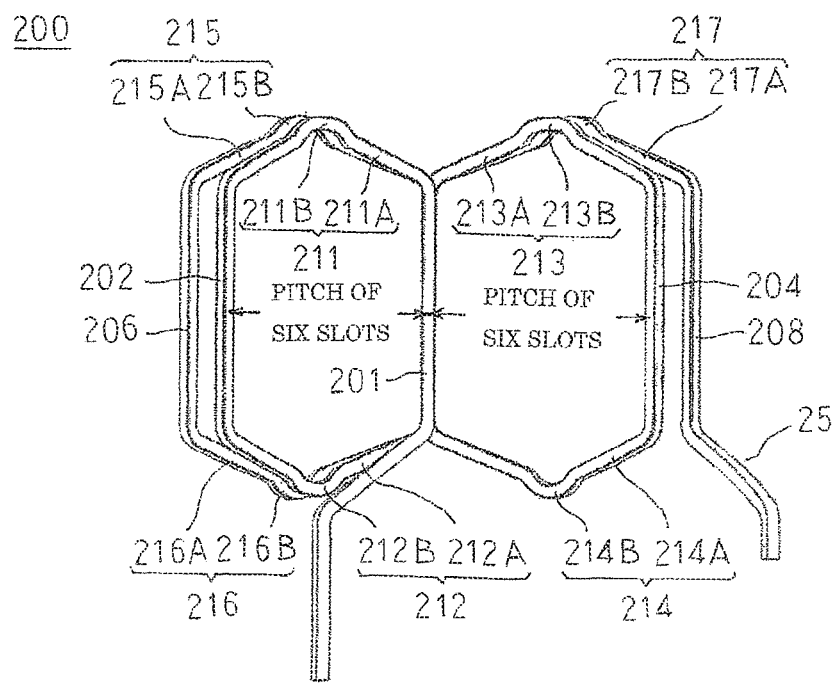
FIG. 6 is an end elevation that shows the coil that constitutes part of the stator winding in the rotary electric machine according to Embodiment 1 of the present invention.
Figure 7:
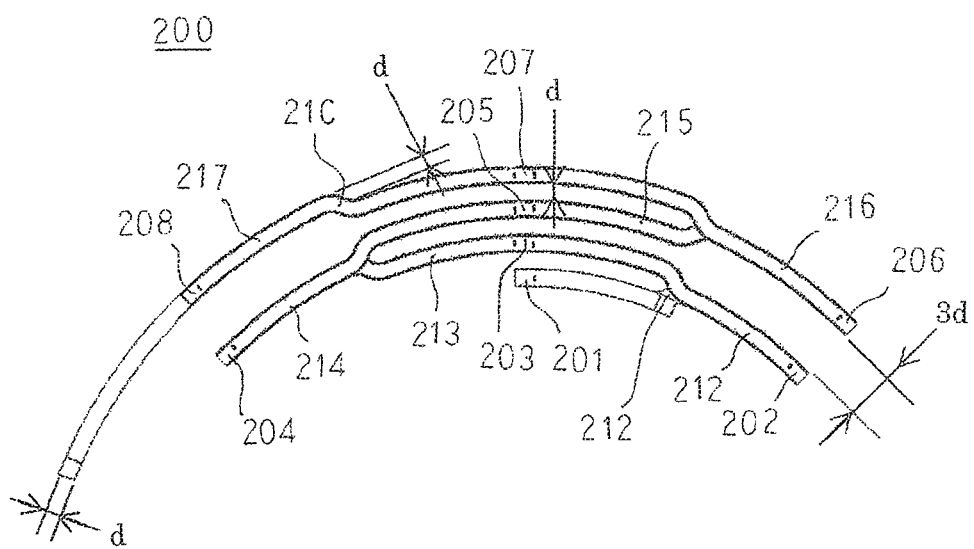
FIG. 7 is a front elevation that shows the coil that constitutes part of the stator winding in the rotary electric machine according to Embodiment 1 of the present invention.
Figure 8:
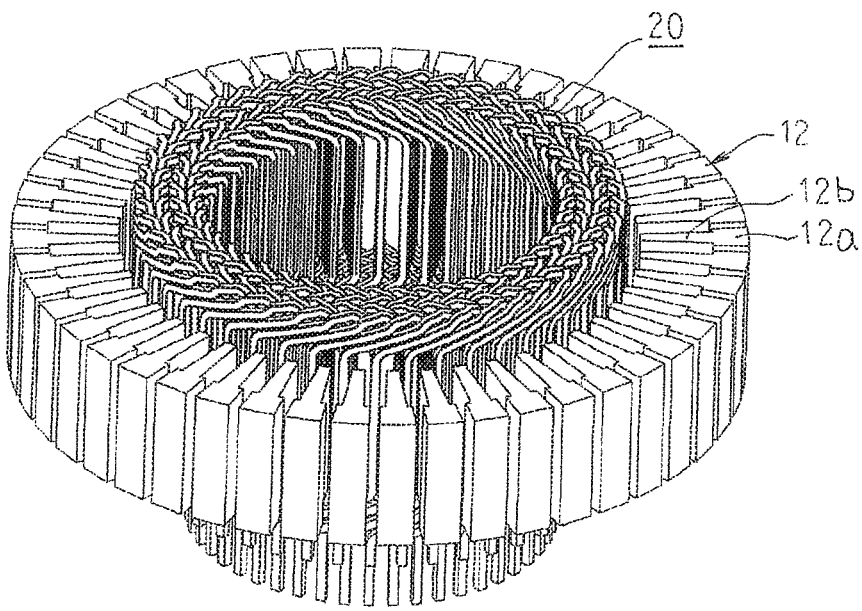
FIG. 8 is an oblique projection that explains an assembly method for the stator in the rotary electric machine according to Embodiment 1 of the present invention.

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows a stator in the rotary electric machine according to Embodiment 1 of the present invention, FIG. 4 is an oblique projection that shows a core block that constitutes part of a stator in the rotary electric machine according to Embodiment 1 of the present invention, FIG. 5 is an oblique projection that shows a coil that constitutes part of a stator winding in the rotary electric machine according to Embodiment 1 of the present invention, FIG. 6 is an end elevation that shows the coil that constitutes part of the stator winding in the rotary electric machine according to Embodiment 1 of the present invention, FIG. 7 is a front elevation that shows the coil that constitutes part of the stator winding in the rotary electric machine according to Embodiment 1 of the present invention, and FIG. 8 is an oblique projection that explains the assembly method for the stator in the rotary electric machine according to Embodiment 1 of the present invention.

In FIGS. 1 and 2, a rotary electric machine 100 includes: a housing 1 that has: a floored cylindrical frame 2; and an end plate 3 that closes an opening of the frame 2; a stator 10 that is inserted into and fixed to a cylindrical portion of the frame 2; and a rotor 5 that is fixed to a rotating shaft 6 that is rotatably supported in the floor portion of the frame 2 and the end plate 3 by means of bearings 4 so as to be rotatably disposed on an inner circumferential side of the stator 10.

The rotor 5 is a permanent-magnet rotor that includes: a rotor core 7 that is fixed to the rotating shaft 6, which is inserted so as to pass through a central position thereof; and permanent magnets 8 that are embedded in a vicinity of an outer circumferential surface of the rotor core 7 so as to be arranged at a uniform pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the stator 10 will be explained in detail with reference to FIGS. 3 through 7.

As shown in FIG. 3, the stator 10 includes: an annular stator core 11; and a stator winding 20 that is mounted to the stator core 11. Here, to facilitate explanation, the number of poles in the rotor 5 is eight, the number of slots in the stator core 11 is forty-eight, and the stator winding 20 is a three-phase winding. In other words, the slots are formed on the stator core 11 at a ratio of two slots per phase per pole.

As shown in FIG. 4, a core block 12 includes: a core back portion 12a that has a circular arc-shaped cross section, that is produced by laminating and integrating electromagnetic steel sheets; and a tooth 12b that projects radially inward from an inner circumferential wall surface of the core back portion 12a. The stator core 11 is configured into an annular shape by arranging and integrating forty-eight core blocks 12 circumferentially by butting together circumferential side surfaces of the core back portions 12a such that the teeth 12b are oriented radially inward. In other words, the core blocks 12 are made by dividing the annular stator core 11 into forty-eight equal sections circumferentially. Slots 13 that are formed by the core back portions 12a and circumferentially adjacent teeth 12b are arranged at a uniform angular pitch circumferentially so as to be open on an inner circumferential side. The teeth 12b are formed so as to have a tapered shape in which a circumferential width becomes gradually narrower radially inward, and a cross section of the slots 13 that is perpendicular to an axial direction of the stator core 11 is oblong.

The stator winding 20 is constituted by forty-eight coils 200 that function as stator winding coils. The coils 200 are produced by winding a conductor wire 25 into an edgewise winding, so as to be wound continuously into a coil pattern in which a δ-shaped coil pattern is repeated for a total of two iterations, the conductor wire being made of jointless continuous copper wire or aluminum wire that is insulated using an enamel resin, for example, and that has an oblong cross section that has a short-side width of d.

Specifically, as shown in FIGS. 5 through 7, the coils 200 include: first, second, third, fourth, fifth, sixth, seventh, and eighth rectilinear portions 201, 202, 203, 204, 205, 206, 207, and 208 that are inserted into the slots 13 of the stator core 11; a first coil end portion 211 that connects together first end portions of the first and second rectilinear portions 201 and 202; a second coil end portion 212 that connects together second end portions of the second and third rectilinear portions 202 and 203; a third coil end portion 213 that connects together first end portions of the third and fourth rectilinear portions 203 and 204; a fourth coil end portion 214 that connects together second end portions of the fourth and fifth rectilinear portions 204 and 205; a fifth coil end portion 215 that connects together first end portions of the fifth and sixth rectilinear portions 205 and 206; a sixth coil end portion 216 that connects together second end portions of the sixth and seventh rectilinear portions 206 and 207; and a seventh coil end portion 217 that connects together first end portions of the seventh and eighth rectilinear portions 207 and 208.

In this manner, the coils 200 are configured such that the first through eighth rectilinear portions 201 through 208 are linked continuously by the first through seventh coil end portions 211 through 217.

The first through seventh coil end portions 211 through 217 include: oblique portions 211A, 212A, 213A, 214A, 215A, 216A, and 217A that rise up obliquely from the first through eighth rectilinear portions 201 through 208, respectively; and bulging portions 211B, 212B, 213B, 214B, 215B, 216B, and 217B that bulge outward in an axial direction (a longitudinal direction of the rectilinear portions) from top portions thereof. In addition, a crank portion 21C that displaces radially by the length d of the short side of the conductor wire 25 is formed on each of the bulging portions 211B through 217B. Furthermore, the oblique portions 211A, 212A, 213A, 214A, 215A, 216A, and 217A maintain radial positions that are similar or identical to those of the first through eighth rectilinear portions 201 through 208 at the point of rising up. In other words, the oblique portions 211A, 212A, 213A, 214A, 215A, 216A, and 217A have circular arc shapes that have as a radius a distance between the first through eighth rectilinear portions 201 through 208 at the point of rising up and a central axis of the stator core 11 when viewed from axially outside when the stator winding 20 is mounted to the stator core 11.

The first, third, fifth, and seventh rectilinear portions 201, 203, 205, and 207 are arranged in a single column such that longitudinal directions of long sides of the oblong cross sections are oriented in a circumferential direction so as to leave gaps d in the longitudinal direction of the short sides of the oblong cross sections. The second and sixth rectilinear portions 202 and 206 are arranged in a single column so as to be separated by a pitch of six slots in a first circumferential direction from the column of first, third, fifth, and seventh rectilinear portions 201, 203, 205, and 207 such that longitudinal directions of long sides of the oblong cross sections are oriented in a circumferential direction so as to leave a gap 3d in the longitudinal direction of the short sides of the oblong cross sections. The fourth and eighth rectilinear portions 204 and 208 are arranged in a single column so as to be separated by a pitch of six slots in a second circumferential direction from the column of first, third, fifth, and seventh rectilinear portions 201, 203, 205, and 207 such that longitudinal directions of long sides of the oblong cross sections are oriented in a circumferential direction so as to leave a gap 3d in the longitudinal direction of the short sides of the oblong cross sections. Moreover, a pitch of six slots is a pitch between slot centers of slots 13 on two sides of six consecutive teeth 12b. Here, a pitch of six slots corresponds to a pitch of one magnetic pole.

Forty-eight coils 200 that are configured in this manner are arranged at a pitch of one slot circumferentially, to assemble the stator winding 20 that is shown in FIG. 3. In the stator winding 20, forty-eight columns of eight first through eighth rectilinear portions 201 through 208 that are lined up in a single column radially are arranged circumferentially at a pitch of one slot.

Then, as shown in FIG. 8, the forty-eight core blocks 12 are arranged at an approximately uniform angular pitch circumferentially such that the respective teeth are positioned on a radially outer side between adjacent columns of first through eighth rectilinear portions 201 through 208 of the stator winding 20. Next, the core blocks 12 that are arranged circumferentially are moved radially inward, to insert the respective teeth 12b of the core blocks 12 between the adjacent columns of first through eighth rectilinear portions 201 through 208.

As shown in FIG. 3, circumferential side surfaces of the adjacent core blocks 12 are butted together to mount the forty-eight core blocks 12 into the stator winding 20. Next, the core blocks 12 that are arranged into an annular shape are integrated by being pressed into and fixed to the frame 2, to produce the stator core 11. The stator winding 20 is thereby mounted to the stator core 11, assembling the stator 10. The first through eighth rectilinear portions 201 through 208 are housed in each of the slots 13 such that the longitudinal directions of the long sides of the oblong cross sections are oriented circumferentially so as to be arranged in a single column in a radial direction. Furthermore, a connection process is applied to the stator winding 20 to form a three-phase alternating-current winding.

Figure 9:
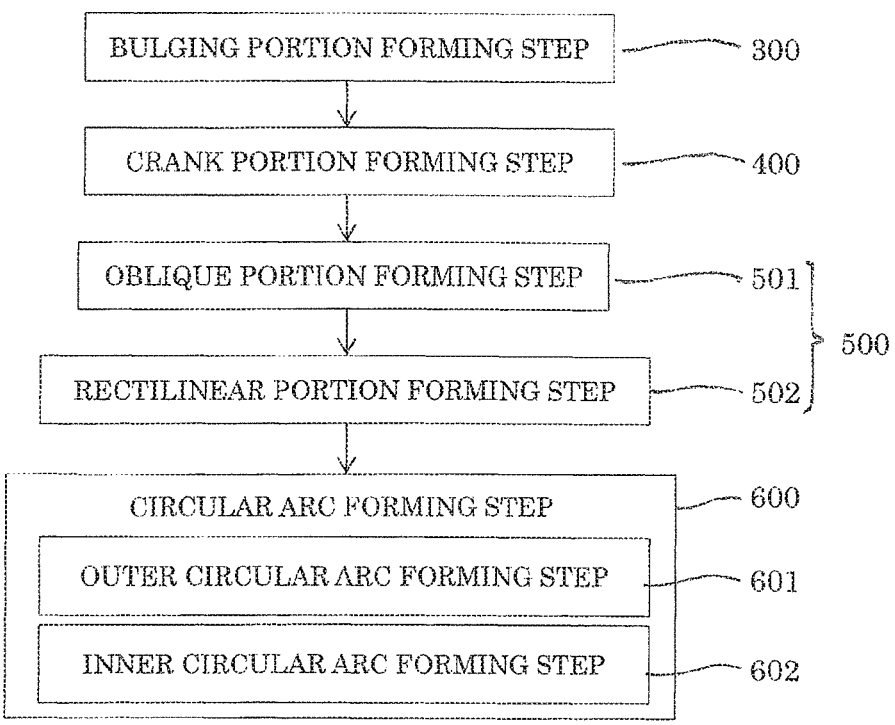
FIG. 9 is a diagram that explains flow in a manufacturing method for a stator winding coil that is used in the rotary electric machine according to Embodiment 1 of the present invention.
Figures 14A, 14B:
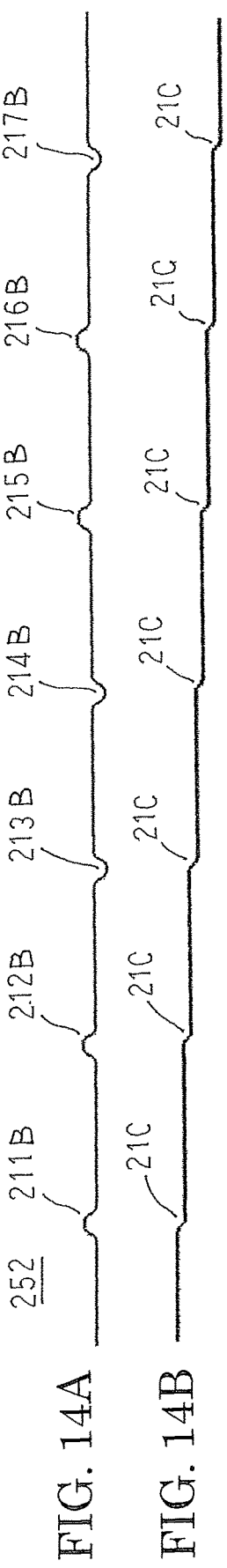
FIGS. 14A and 14B show schematic diagrams that show a conductor wire on which crank portions have been formed in the manufacturing method for the stator winding coil that is used in the rotary electric machine according to Embodiment 1 of the present invention.
Figure 15:
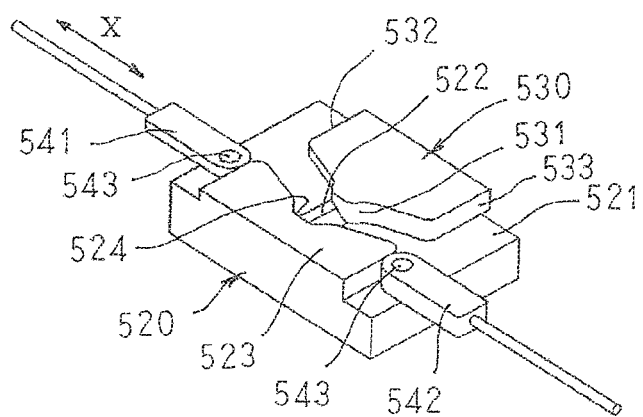
FIG. 15 is an oblique projection that shows an oblique portion and rectilinear portion forming apparatus in the manufacturing method for the stator winding coil that is used in the rotary electric machine according to Embodiment 1 of the present invention.
Figure 16A:
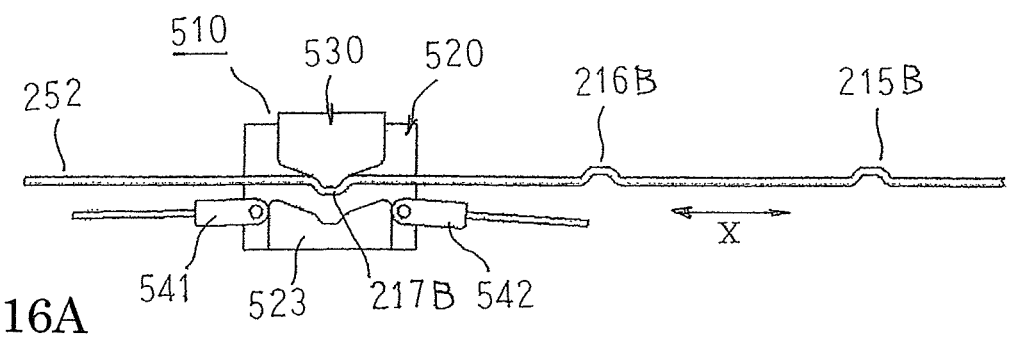
FIGS. 16A through 16C show process diagrams that explain an oblique portion and rectilinear portion forming step in the manufacturing method for the stator winding coil that is used in the rotary electric machine according to Embodiment 1 of the present invention.
Figure 16B:
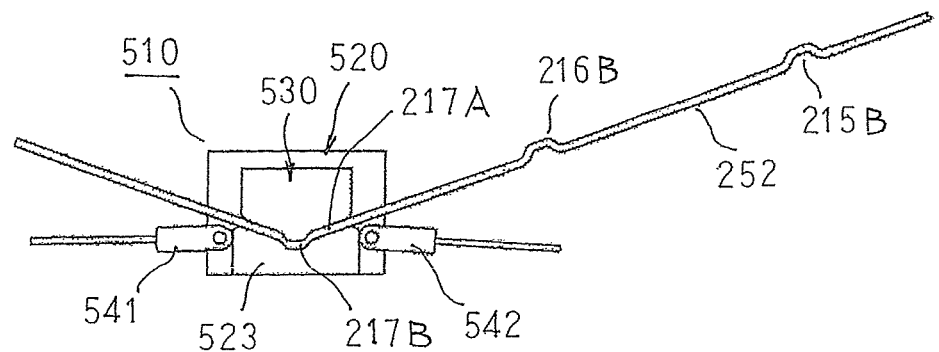
Figure 16C:
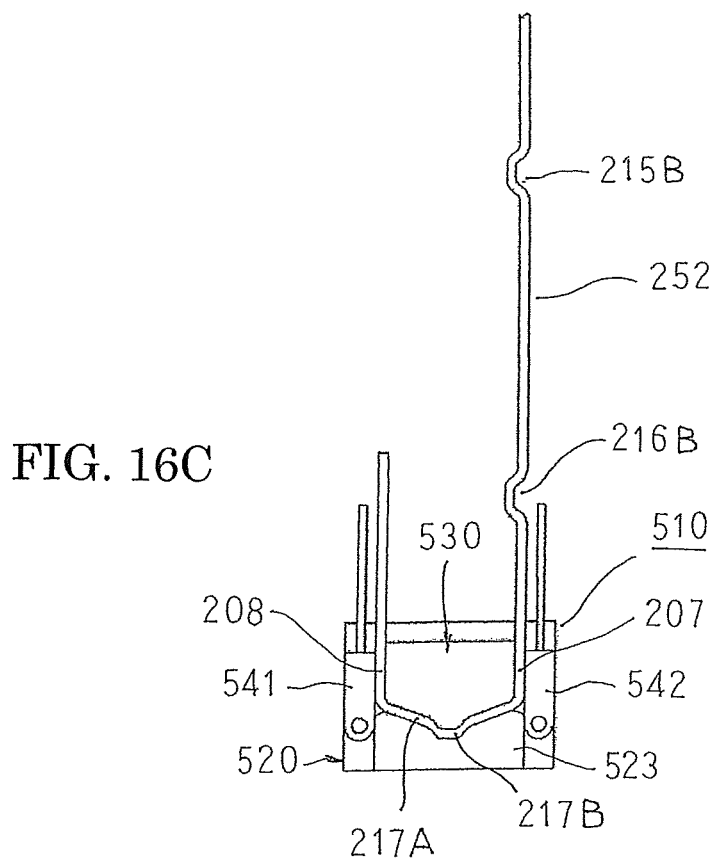
Figure 18:
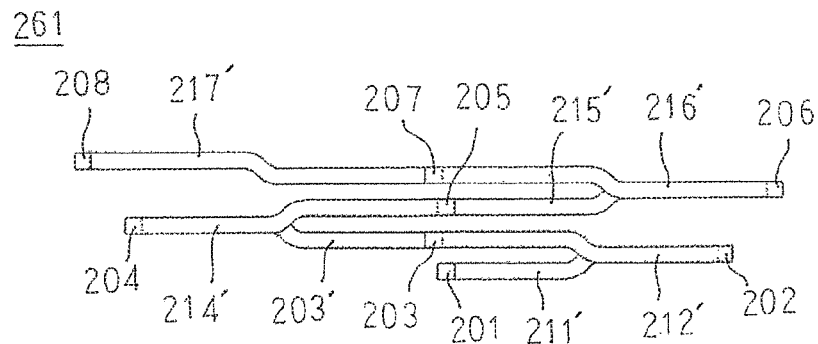
FIG. 18 is an end elevation that shows a coil before an outer coil end portion circular arc forming step in the manufacturing method for the stator winding coil that is used in the rotary electric machine according to Embodiment 1 of the present invention.
Figure 19:
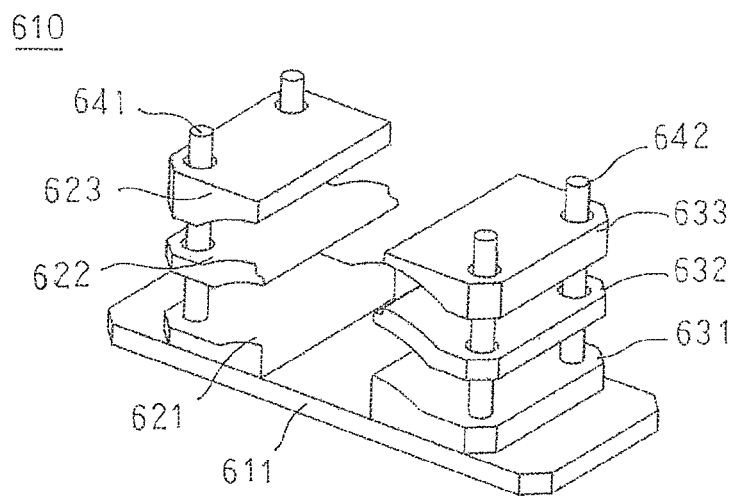
FIG. 19 is an oblique projection that shows an apparatus that forms an outer coil end portion of a coil into a circular arc shape in the manufacturing method for the stator winding coil that is used in the rotary electric machine according to Embodiment 1 of the present invention.
Figure 20:
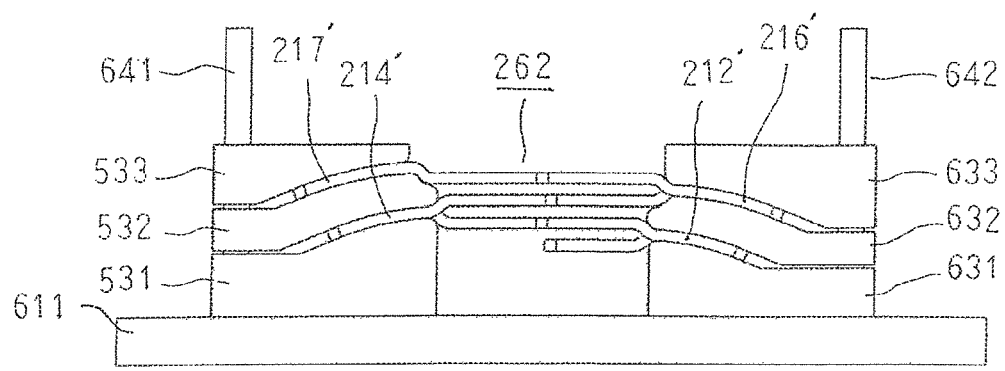
FIG. 20 is a diagram that explains an outer coil end portion circular arc forming step in the manufacturing method for the stator winding coil that is used in the rotary electric machine according to Embodiment 1 of the present invention.
Figure 21:
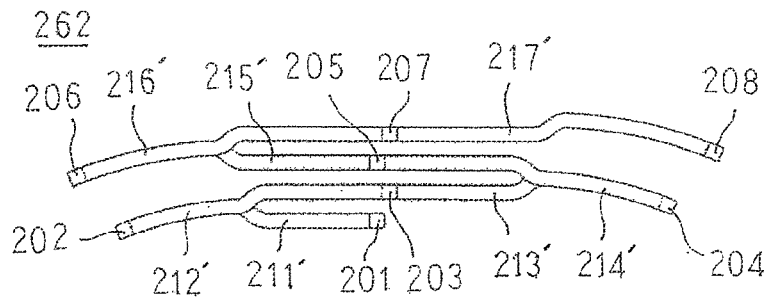
FIG. 21 is an end elevation that shows a coil before an inner coil end portion circular arc forming step in the manufacturing method for the stator winding coil that is used in the rotary electric machine according to Embodiment 1 of the present invention.
Figure 22:
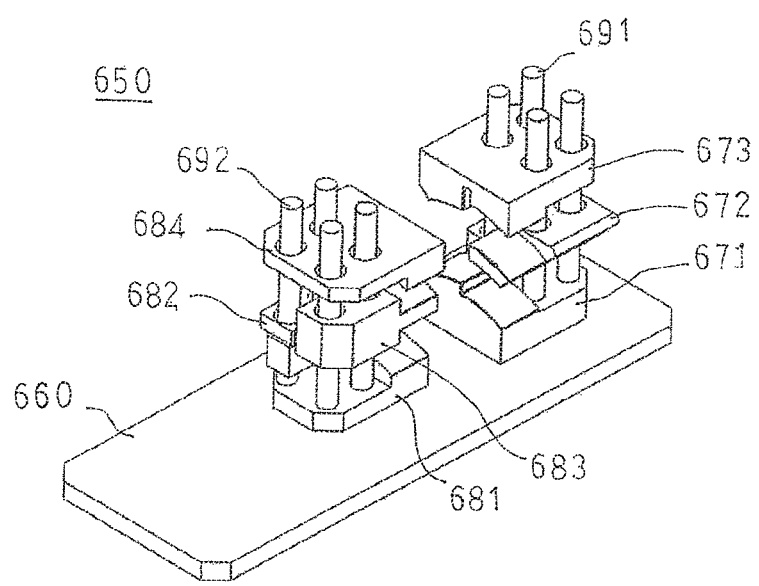
FIG. 22 is an oblique projection that shows an apparatus that forms an inner coil end portion of a coil into a circular arc shape in the manufacturing method for the stator winding coil that is used in the rotary electric machine according to Embodiment 1 of the present invention.
Figure 23:
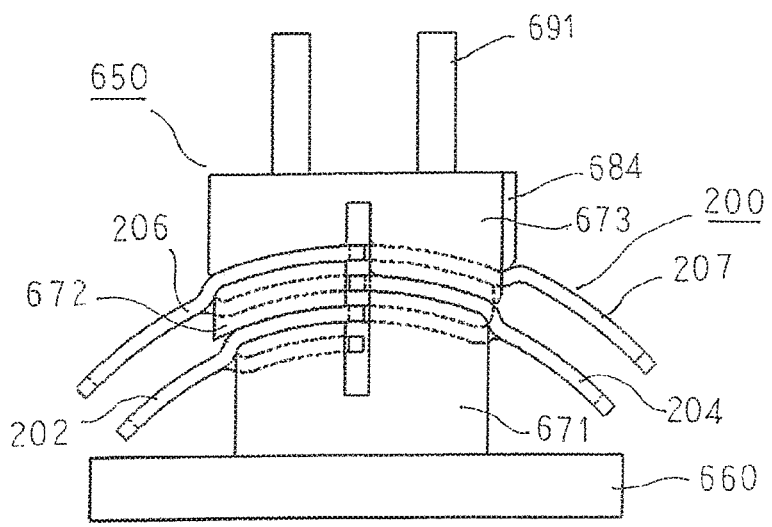
FIG. 23 is a diagram that explains an inner coil end portion circular arc forming step in the manufacturing method for the stator winding coil that is used in the rotary electric machine according to Embodiment 1 of the present invention.

Next, a manufacturing method for the coils 200 will be explained with reference to FIGS. 9 through 23. FIG. 9 is a diagram that explains flow in a manufacturing method for a stator winding coil that is used in the rotary electric machine according to Embodiment 1 of the present invention, FIGS. 10A through 10F show process diagrams that explain a bulging portion forming step in the manufacturing method for the stator winding coil that is used in the rotary electric machine according to Embodiment 1 of the present invention, FIG. 11 is a schematic diagram that shows a conductor wire on which bulging portions have been formed in the manufacturing method for the stator winding coil that is used in the rotary electric machine according to Embodiment 1 of the present invention, FIG. 12 is an oblique projection that shows a crank portion forming apparatus in the manufacturing method for the stator winding coil that is used in the rotary electric machine according to Embodiment 1 of the present invention, FIGS. 13A through 13C show process diagrams that explain a crank portion forming step in the manufacturing method for the stator winding coil that is used in the rotary electric machine according to Embodiment 1 of the present invention, FIGS. 14A and 14B show schematic diagrams that show a conductor wire on which crank portions have been formed in the manufacturing method for the stator winding coil that is used in the rotary electric machine according to Embodiment 1 of the present invention, FIG. 15 is an oblique projection that shows an oblique portion and rectilinear portion forming apparatus in the manufacturing method for the stator winding coil that is used in the rotary electric machine according to Embodiment 1 of the present invention, FIGS. 16A through 16C show process diagrams that explain an oblique portion and rectilinear portion forming step in the manufacturing method for the stator winding coil that is used in the rotary electric machine according to Embodiment 1 of the present invention, FIGS. 17A through 17G show schematic diagrams that show the oblique portion and rectilinear portion forming step in the manufacturing method for the stator winding coil that is used in the rotary electric machine according to Embodiment 1 of the present invention, FIG. 18 is an end elevation that shows a coil before an outer coil end portion circular arc forming step in the manufacturing method for the stator winding coil that is used in the rotary electric machine according to Embodiment 1 of the present invention, FIG. 19 is an oblique projection that shows an apparatus that forms an outer coil end portion of a coil into a circular arc shape in the manufacturing method for the stator winding coil that is used in the rotary electric machine according to Embodiment 1 of the present invention, FIG. 20 is a diagram that explains an outer coil end portion circular arc forming step in the manufacturing method for the stator winding coil that is used in the rotary electric machine according to Embodiment 1 of the present invention, FIG. 21 is an end elevation that shows a coil before an inner coil end portion circular arc forming step in the manufacturing method for the stator winding coil that is used in the rotary electric machine according to Embodiment 1 of the present invention, FIG. 22 is an oblique projection that shows an apparatus that forms an inner coil end portion of a coil into a circular arc shape in the manufacturing method for the stator winding coil that is used in the rotary electric machine according to Embodiment 1 of the present invention, and FIG. 23 is a diagram that explains an inner coil end portion circular arc forming step in the manufacturing method for the stator winding coil that is used in the rotary electric machine according to Embodiment 1 of the present invention.

As shown in FIG. 9, the manufacturing method for the coils 200 includes: a bulging portion forming step 300; a crank portion forming step 400; an oblique portion and rectilinear portion forming step 500 (an oblique portion forming step 501 and a rectilinear portion forming step 502); and a circular arc forming step 600.

As shown in FIG. 10A, a bulging portion forming machine 310 that is used in the bulging portion forming step 300 includes: a fixed base 311; a bulging portion forming die 312 that is disposed on the fixed base 311 in a fixed state; a bulging portion forming perpendicular sliding die 313 that is installed on the bulging portion forming die 312 so as to be movable in a direction that is perpendicular to an X direction; and a bulging portion-fixing sliding clamper 321 that is installed on the fixed base 311 so as to be able to reciprocate in the X direction. Here, the X direction is aligned with a longitudinal direction of the conductor wire 25, i.e., a direction of feeding of the conductor wire 25.

The bulging portion forming die 312 has: a recess portion 312a that has an inner peripheral surface that conforms to an outer peripheral surface shape of the bulging portions 211B through 217B that are formed on the conductor wire 25; and a pair of guiding portions 312b that are disposed at two ends of the recess portion 312a in the X direction to guide the conductor wire 25. The bulging portion forming perpendicular sliding die 313 has a protruding portion 313a that has an outer peripheral surface that conforms to an inner peripheral surface shape of the bulging portions 211B through 217B that are formed on the conductor wire 25, and is installed on the bulging portion forming die 312 such that the protruding portion 313a is directed toward the recess portion 312a so as to be able to approach and be separated from the recess portion 312a. The bulging portion fixing sliding clamper 321 includes: pairs of guiding portions 321a that are disposed so as to be separated in the X direction to guide the conductor wire 25; and an interfitting portion 321b that is disposed between the pairs of guiding portions 321a, and that is formed so as to have a surface shape such that two outer peripheral surfaces in a direction that is perpendicular to the X direction conform to the inner peripheral surface shape of the bulging portions 211B through 217B, and is installed on the fixed base 311 such that the guiding portions 321a and the interfitting portion 321b are arranged in a straight line with the guiding portions 312b in the X direction.

In the bulging portion forming step 300, the protruding portion 313a of the bulging portion forming perpendicular sliding die 313 recedes to a position that is separated from the recess portion 312a. Then, as shown in FIG. 10A, the rectilinear conductor wire 25 is fed by a predetermined amount in the X direction so as to pass between the pair of guiding portions 312b such that the longitudinal direction of the short sides of the oblong cross section is perpendicular to the X direction and the direction of movement of the bulging portion forming perpendicular sliding die 313. Next, as shown in FIG. 10(b), the bulging portion forming perpendicular sliding die 313 is operated such that the protruding portion 313a moves toward the recess portion 312a. The conductor wire 25 is thereby clamped between the recess portion 312a and the protruding portion 313a to form the bulging portion 217B.

Next, the bulging portion forming perpendicular sliding die 313 is operated such that the protruding portion 313a moves away from the recess portion 312a to release holding of the conductor wire 25. Then the conductor wire 25 is fed by a predetermined amount in the X direction. Then, as shown in FIG. 10C, the conductor wire 25 is rotated around the longitudinal direction thereof by 180 degrees to reverse the orientation of the bulging portion 217B. Then portions at two ends of the bulging portion 217B are fitted into the guiding portions 321a, and the interfitting portion 321b is fitted inside the bulging portion 217B. Movement of the conductor wire 25 in the X direction is restricted thereby. Next, the bulging portion fixing sliding clamper 321 is moved to a predetermined position in the X direction.

Next, as shown in FIG. 10D, the bulging portion forming perpendicular sliding die 313 is operated to clamp the conductor wire 25 between the recess portion 312a and the protruding portion 313a to form the bulging portion 216B. Next, the bulging portion forming perpendicular sliding die 313 is operated such that the protruding portion 313a moves away from the recess portion 312a to release holding of the conductor wire 25. Then interfitting between the bulging portion 217B and the guiding portions 321a and interfitting portion 321b is released. Then the conductor wire 25 is fed in the X direction, and the bulging portion 216B is fitted into the guiding portions 321a and the interfitting portion 321b, as shown in FIG. 10E. Next, as shown in FIG. 10F, the bulging portion forming perpendicular sliding die 313 is operated to clamp the conductor wire 25 between the recess portion 312a and the protruding portion 313a to form the bulging portion 215B.

This operation is performed repeatedly to obtain a bulging portion formed conductor wire 251 on which the seven bulging portions 217B, 216B, 215B, 214B, 213B, 212B, and 211B are formed at prescribed positions, as shown in FIG. 11.

As shown in FIG. 12, a crank portion forming machine 410 includes: a first holding member 421 on a first surface of which are installed: first holding portions 411 that hold a portion of the bulging portion formed conductor wire 251 at a first end of a bulging portion from opposite sides; and a second holding portion 412 that cooperates with the first holding portions 411 to restrict movement of the bulging portion formed conductor wire 251 in the longitudinal direction (the X direction) by contacting an inner peripheral surface of a raised portion on a first side of the bulging portion; and a first pressing plate 423 that is installed so as to be able to reciprocate vertically so as to be guided by supporting posts 422 that are erected on a first surface of the first holding member 421; a second holding member 431 on a first surface of which are installed: third holding portions 413 that hold a portion of the bulging portion formed conductor wire 251 at a second end of the bulging portion from opposite sides; and a fourth holding portion 414 that cooperates with the third holding portions 413 to restrict movement of the bulging portion formed conductor wire 251 in the X direction by contacting an inner peripheral surface of a raised portion of the second side of the bulging portion; and a second pressing plate 433 that is installed so as to be able to reciprocate vertically so as to be guided by supporting posts 432 that are erected on a first surface of the second holding member 431. Here, the third holding portions 413, the fourth holding portion 414, the third holding member 431, and the second pressing plate 433 constitute a first metal die, and the first holding portions 411, the second holding portion 412, the first holding member 421, and the first pressing plate 423 constitute a second metal die.

As shown in FIG. 13A, the first holding member 421 is disposed so as to be guided by rails 424 that are installed on a base 441 so as to be movable in the X direction. As shown in FIGS. 12 and 13A, the second holding member 431 is installed on the base 441 so as to be positioned at the first end of the first holding member 421 in the X direction so as to have spring members 434 interposed. The spring members 434 are produced such that the first surface of the second holding member 431 is flush with the first surface of the first holding member 421 in an unloaded state. Moreover, the first holding portions 411, the second holding portion 412, the fourth holding portion 414, and the third holding portions 413 are disposed so as to line up in a single row in the X direction.

In the crank portion forming step 400, as shown in FIGS. 12 and 13A, the bulging portion formed conductor wire 251 is set in the crank portion forming machine 410 such that the two ends of the bulging portion 217B are sandwiched between the first holding portions 411 and the third holding portions 413, and the inner peripheral surface of the raised portion of the bulging portion 217B contacts the second holding portion 412 and the fourth holding portion 414. Next, the first pressing plate 423 is lowered until it contacts the first holding portions 411 and the second holding portion 412. The bulging portion formed conductor wire 251 is thereby held by the first holding member 421 and the first pressing plate 423.

Next, as shown in FIG. 13B, the second pressing plate 433 is lowered until it contacts the third holding portions 413 and the fourth holding portion 414. The bulging portion formed conductor wire 251 is thereby held by the second holding member 431 and the second pressing plate 433. Next, the second pressing plate 433 is pressed downward, as shown in FIG. 13C. The spring members 434 are compressed thereby, and the second holding member 431 and the second pressing plate 433 descend to form the crank portion 21C on the bulging portion 217B. Here, the first holding member 421 and the first pressing plate 423 that are holding the bulging portion formed conductor wire 251 are guided by the rails 424 so as to move toward the second holding member 431 and the second pressing plate 433. Stretching of the bulging portion 217B during crank portion formation is thereby suppressed, suppressing the occurrence of thinning and damage to the insulating coating on the bulging portion formed conductor wire 251.

This operation is performed repeatedly while feeding the bulging portion formed conductor wire 251 in the X direction to form the crank portions 21C on each of the bulging portions 217B, 216B, 215B, 214B, 213B, 212B, and 211B, to obtain the intermediate conductor wire 252 that is shown in FIGS. 14A and 14B.

As shown in FIG. 15, an oblique portion and rectilinear portion forming machine 510 includes: a fixed die 520; a movable die 530 that forms oblique portions by bending; and bending portions 541 and 542 that form rectilinear portions by bending. An upper surface 521 of the fixed die 520 is formed so as to have a stepped shape in the X direction on opposite sides of a stepped portion 522 that conforms to the crank portions 21C, and a receiving portion 523 is disposed on the upper surface 521 so as to extend from a first end to a second end of the step. The receiving portion 523 has a receiving surface 524 that is formed so as to have a surface shape that conforms to an outer peripheral surface shape of a coil end portion on which the crank portion, the bulging portion, and the oblique portions are formed. The movable die 530 has: a pressing surface 531 that conforms to an inner peripheral surface shape of a coil end portion on which the crank portion, the bulging portion, and the oblique portions are formed; and rectilinear portion receiving surfaces 532 and 533 that extend in a direction that is perpendicular to the X direction from two ends of the pressing surface 531. The movable die 530 is installed on the upper surface 521 of the fixed die 520 such that the pressing surface 531 faces toward the receiving surface 524 so as to be able to approach and separate from the receiving portion 523. The bending portions 541 and 542 are mounted to the fixed die 520 so as to be pivotable around pins 543 so as to be separated from the two ends of the receiving surface 524 of the receiving portion 523 in the X direction.

In the oblique portion and rectilinear portion forming step 500, as shown in FIG. 16A, the intermediate conductor wire 252 is fed in the X direction so as to position the intermediate conductor wire 252 such that the bulging portion 217B matches a top portion of the pressing surface 531. Here, the bulging portion 217B is positioned at the stepped portion 522, and portions of the intermediate conductor wire 252 at two ends of the bulging portion 217B are in contact with the upper surface 521 of the fixed die 520 that is formed into the stepped shape. Next, as shown in FIG. 16B, the movable die 530 is moved toward the receiving portion 523. The bulging portion 217B of the intermediate conductor wire 252 and the portions at the two ends thereof are thereby clamped between the pressing surface 531 and the receiving surface 524 to form the oblique portions 217A at the two ends of the bulging portion 217B (the oblique portion forming step 501). Next, the bending portions 541 and 542 are pivoted around the pins 543, as shown in FIG. 16C. Portions of the intermediate conductor wire 252 that extend from the oblique portions 217A are thereby clamped between the rectilinear portion receiving surfaces 532 and 533 and the bending portions 541 and 542 to form the seventh rectilinear portion 207 and the eighth rectilinear portion 208 at two ends of the oblique portions 217A (the rectilinear portion forming step 502).

As shown in FIG. 17A, the oblique portions 217A and the seventh and eighth rectilinear portions 207 and 208 are thereby formed on the intermediate conductor wire 252 using the bulging portion 217B of the intermediate conductor wire 252 as a reference point. Next, the intermediate conductor wire 252 is positioned so as to match the bulging portion 216B to the top portion of the pressing surface 531. Then the movable die 530 is operated, and the bending portions 541 are also operated, to form the oblique portions 216A and the sixth rectilinear portion 206 using the bulging portion 216B as a reference point, as shown in FIG. 17B.

Next, the oblique portions 215A and the fifth rectilinear portion 205 are formed using the bulging portion 215B as a reference point, as shown in FIG. 17C. Next, the oblique portions 214A and the fourth rectilinear portion 204 are formed using the bulging portion 214B as a reference point, as shown in FIG. 17D. Next, the oblique portions 213A and the third rectilinear portion 203 are formed using the bulging portion 213B as a reference point, as shown in FIG. 17E. Next, the oblique portions 212A and the second rectilinear portion 202 are formed using the bulging portion 212B as a reference point, as shown in FIG. 17F. Moreover, 212', 213', 214', 215', 216', and 217' in FIGS. 17A through 17F represent rectilinear second through seventh coil end portions before circular arc formation.

Next, the oblique portions 211A and the first rectilinear portion 201 are formed using the bulging portion 211B as a reference point. As shown in FIG. 18, an intermediate rectilinear coil 261 that has a coil pattern in which a δ-shaped coil pattern is repeated for a total of two iterations is produced thereby.

The circular arc forming step 600 is divided into: an outer circular arc forming step 601 that forms a group of coil end portions on an outer side of the intermediate rectilinear coil 261 into a circular arc shape; and an inner circular arc forming step 602 that forms a group of coil end portions on an inner side of the intermediate rectilinear coil 261 into a circular arc shape.

As shown in FIG. 19, an outer circular arc forming machine 610 includes: a flat die base 611; and dies 621, 622, 623, 631, 632, and 633 that have pressing surfaces that are constituted by portions of cylindrical surfaces.

As shown in FIG. 20, in the outer circular arc forming step 601, the dies 621, 622, and 623 are mounted so as to be able to move vertically so as to be guided by a pair of guiding pins 641 that are erected on the die base 611, and the dies 631, 632, and 633 are mounted so as to be able to move vertically so as to be guided by a pair of guiding pins 642 that are erected on the die base 611. Then the intermediate rectilinear coil 261 is set in the outer circular arc forming machine 610 such that the oblique portions 211A and 212A of the first and second coil end portions 211' and 212' are inserted between the pressing surfaces of the dies 631 and 632, the oblique portions 213A and 214A of the third and fourth coil end portions 213' and 214' are inserted between the pressing surfaces of the dies 621 and 622, the oblique portions 215A and 216A of the fifth and sixth coil end portions 215' and 216' are inserted between the pressing surfaces of the dies 632 and 633, and the oblique portion 217A of the seventh coil end portion 217' is inserted between the pressing surfaces of the dies 622 and 623. Then the dies 622, 623, 632, and 633 are lowered using the guiding pins 641 and 642 as guides.

The oblique portions 211A, 212A, 213A, 214A, 215A, 216A, and 217A on the outer side of the first through seventh coil end portions 211', 212', 213', 214', 215', 216', and 217' are thereby clamped between the dies 621, 622, 623, 631, 632, and 633, and are formed into circular arc shapes, to produce the intermediate coil 262 that is shown in FIG. 21.

As shown in FIG. 22, an inner circular arc forming machine 650 includes: a flat die base 660; and dies 671, 672, 673, 681, 682, 683, and 684 that have pressing surfaces that are constituted by portions of cylindrical surfaces.

As shown in FIG. 23, in the inner circular arc forming step 602, the dies 671, 672, and 673 are mounted so as to be able to move vertically so as to be guided by a pair of guiding pins 691 that are erected on the die base 660, and the dies 681, 682, 683, and 684 are mounted so as to be able to move vertically so as to be guided by a pair of guiding pins 692 that are erected on the die base 660. Then the intermediate coil 262 is set in the outer circular arc forming machine 660 such that the oblique portion 211A of the first coil end portion 211' is inserted between the pressing surfaces of the dies 681 and 682, the oblique portion 212A of the second coil end portion 212' is inserted between the pressing surfaces of the dies 671 and 672, the oblique portion 213A of the third coil end portion 213' is inserted between the pressing surfaces of the dies 681 and 683, the oblique portion 214A of the fourth coil end portion 214' is inserted between the pressing surfaces of the dies 671 and 673, the oblique portion 215A of the fifth coil end portion 215' is inserted between the pressing surfaces of the dies 682 and 684, the oblique portion 216A of the sixth coil end portion 216' is inserted between the pressing surfaces of the dies 672 and 673, and the oblique portion 217A of the seventh coil end portion 217' is inserted between the pressing surfaces of the dies 683 and 684. Then the dies 672, 673, 682, 683, and 684 are lowered using the guiding pins 691 and 692 as guides.

The oblique portions 211A, 212A, 213A, 214A, 215A, 216A, and 217A on the first through seventh coil end portions 211', 212', 213', 214', 215', 216', and 217' are thereby clamped between the dies 671, 672, 673, 681, 682, 683, and 684, and are formed into circular arc shapes, to produce a coil 200.

According to Embodiment 1, formation of bulging portions (the bulging portion forming step 300), formation of crank portions (the crank portion forming step 400), formation of oblique portions (the oblique portion forming step 501), formation of rectilinear portions (the rectilinear portion forming step 502), and formation of circular arcs (the circular arc forming step 600) are each performed in dedicated steps. Thus, simplification of configuration and reductions of size of the forming machines that are used in each of the steps are enabled, enabling manufacturing equipment costs to be reduced. Machining force for formation in each of the steps is also reduced, enabling the occurrence of damage to the insulating coating that is coated onto the conductor wire to be suppressed, thereby enabling insulation to be improved.

In the crank portion forming step 400, the first holding member 421 and the first pressing plate 423, which hold a portion of the bulging portion formed conductor wire 251 at the first end of the bulging portion from opposite sides, are configured so as to be movable in the longitudinal direction of the bulging portion formed conductor wire 251, and the second holding member 431 and the second pressing plate 433, which hold a portions of the bulging portion formed conductor wire 251 at the second end of the bulging portion from opposite sides, are configured such that movement in the longitudinal direction of the bulging portion formed conductor wire 251 is restricted, and so as to be movable vertically. Thus, when the second holding member 431 and the second pressing plate 433 are lowered to form the crank portions 21C, the first holding member 421 and the first pressing plate 423 are displaced toward the second holding member 431 and the second pressing plate 433, enabling stretching of the bulging portion during crank portion formation to be suppressed. The occurrence of thinning and damage to the insulating coating on the bulging portion formed conductor wire 251 is thereby suppressed.

Because the oblique portions and the rectilinear portions are formed in the oblique portion forming step 501 and the rectilinear portion forming step 502 using a bulging portion as a reference point, the coils 200 can be produced with high dimensional precision.

Because the circular arc forming step 600 is divided into the outer circular arc forming step 601 and the inner circular arc forming step 602, simplification of configuration and reductions in the size of the forming machines can be achieved, and machining force for formation is also reduced.

Moreover, in Embodiment 1 above, the coils 200 are configured by linking eight rectilinear portions continuously by coil end portions, but the number of the rectilinear portions that constitute the coils 200 is not limited to eight, and need only be 2m or more, where m is an integer that is greater than or equal to two. The 2m rectilinear portions are then housed in each of the slots 13 so as to be arranged in a single column radially.

In Embodiment 1 above, spacing between the rectilinear portions of the coils 200 that are linked by the coil end portions is set to a pitch of six slots, but the spacing between the rectilinear portions is not limited to a pitch of six slots, and may be a pitch of five slots, for example.

In Embodiment 1 above, all spacing between the rectilinear portions of the coils 200 that are linked by the coil end portions is a pitch of six slots, but the spacing between the rectilinear portions that are linked by the coil end portions is not limited to being all at a pitch of six slots, and a pitch of six slots and a pitch of five slots may be mixed, for example.

In Embodiment 1 above, the crank portions 21C are formed so as to displace the rectilinear portions that are linked by the coil end portions radially by a radial thickness d of the conductor wire, but the crank portions 21C need only be formed so as to displace the rectilinear portions that are linked by the coil end portions (a×d) radially, where a is an integer that is greater than or equal to one and less than or equal to $(m_1-1)$, $2m_1$ being the number of rectilinear portions that are inserted into the slots in a single column.

In Embodiment 1 above, coils 200 that are produced by winding conductor wire into a coil pattern in which a δ-shaped coil pattern is repeated for a total of two iterations have been explained, but it goes without saying that the present manufacturing method can also be applied to coils that have a coil pattern that is produced by winding the conductor wire a plurality of times into a helical shape, also known as "a hexagonal coil pattern", or coils that have a wave-shaped coil pattern in which the conductor wire is wound in a wave shape, etc.

Embodiment 2

Figure 24:
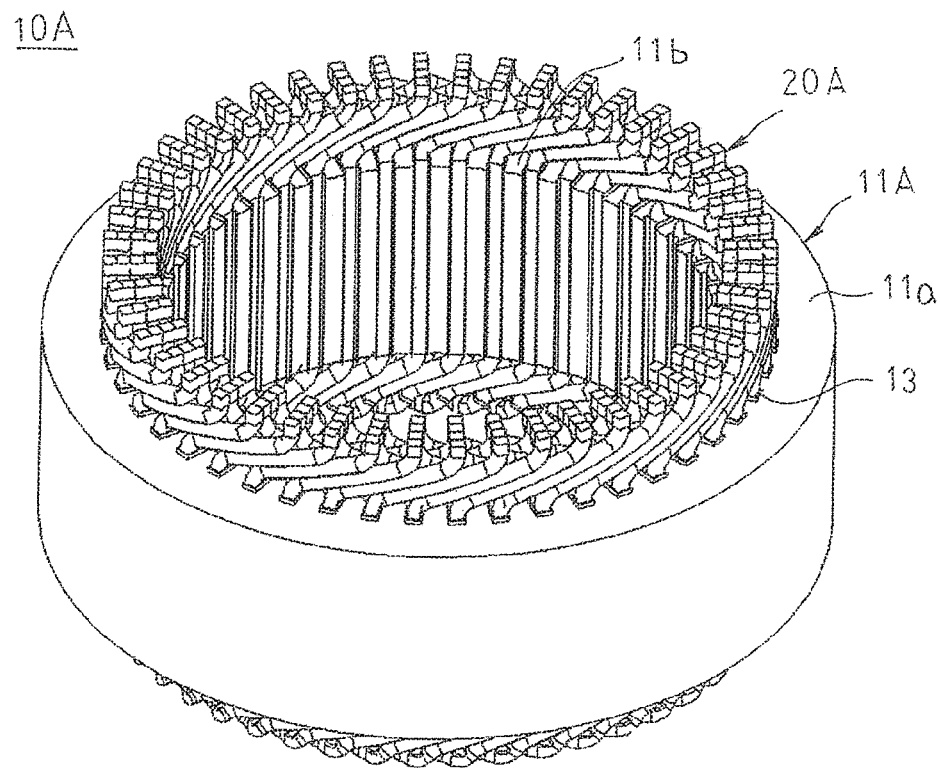
FIG. 24 is an oblique projection that shows a stator in a rotary electric machine according to Embodiment 2 of the present invention.
Figure 25:
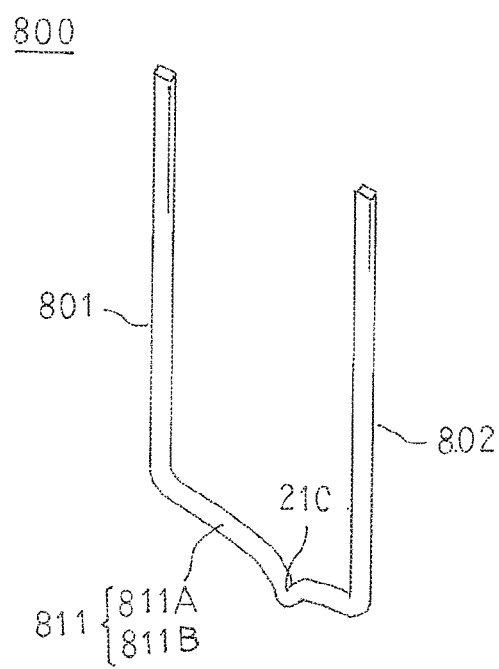
FIG. 25 is an oblique projection that shows a coil that constitutes part of a stator winding in the rotary electric machine according to Embodiment 2 of the present invention.
Figure 26:
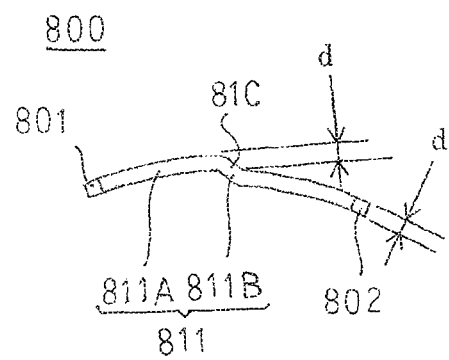
FIG. 26 is an end elevation that shows the coil that constitutes part of the stator winding in the rotary electric machine according to Embodiment 2 of the present invention.
Figure 27:
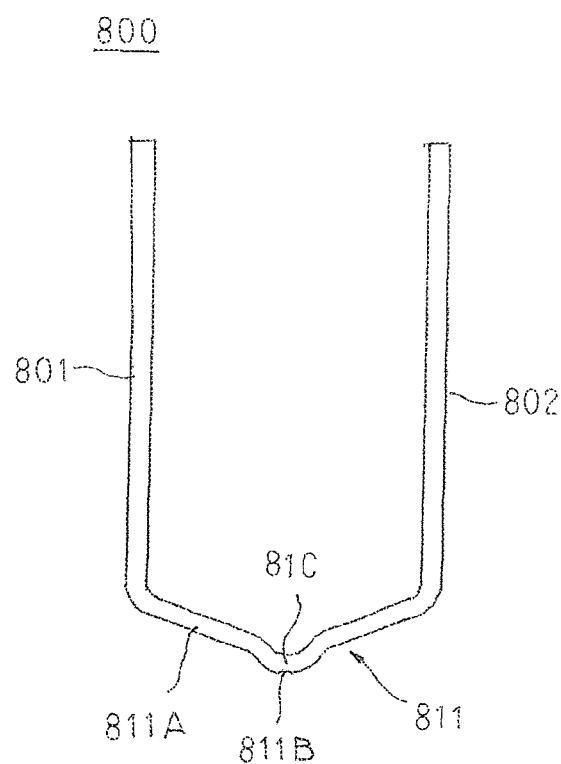
FIG. 27 is a front elevation that shows the coil that constitutes part of the stator winding in the rotary electric machine according to Embodiment 2 of the present invention.
Figure 28:
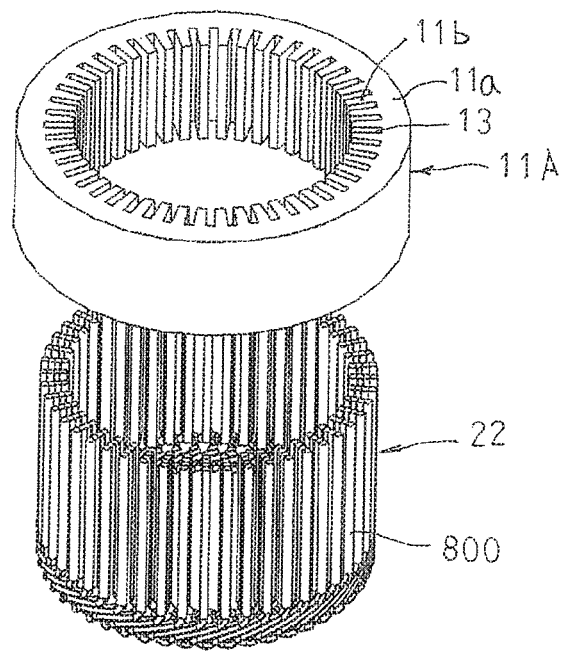
FIG. 28 is an oblique projection that explains an assembly method for the stator in the rotary electric machine according to Embodiment 2 of the present invention.
Figure 29:
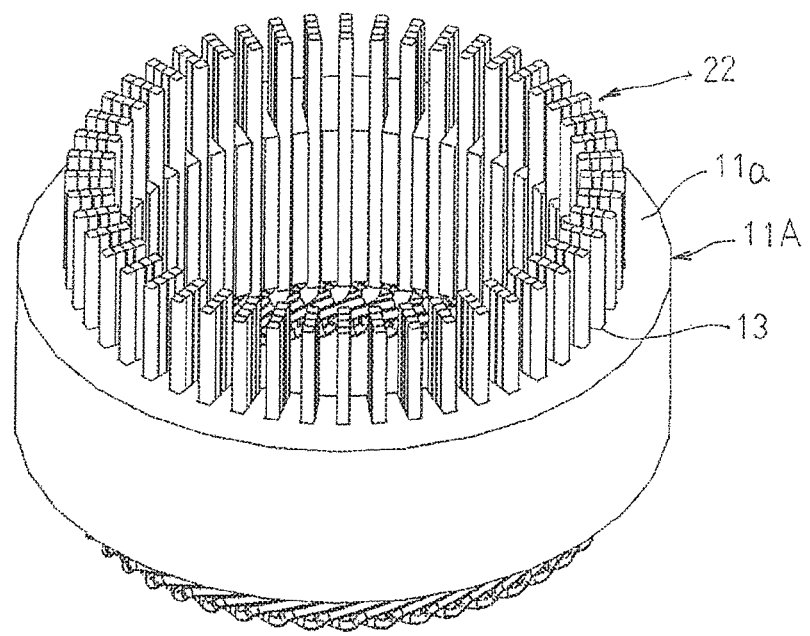
FIG. 29 is an oblique projection that explains the assembly method for the stator in the rotary electric machine according to Embodiment 2 of the present invention.
Figure 30:
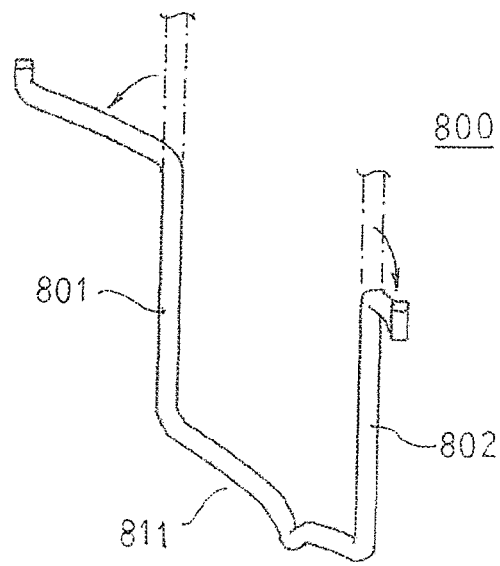
FIG. 30 is an oblique projection that shows a state in which terminals of a coil that constitutes part of a stator winding in the rotary electric machine according to Embodiment 2 of the present invention are twisted.

FIG. 24 is an oblique projection that shows a stator in a rotary electric machine according to Embodiment 2 of the present invention, FIG. 25 is an oblique projection that shows a coil that constitutes part of a stator winding in the rotary electric machine according to Embodiment 2 of the present invention, FIG. 26 is an end elevation that shows the coil that constitutes part of the stator winding in the rotary electric machine according to Embodiment 2 of the present invention, FIG. 27 is a front elevation that shows the coil that constitutes part of the stator winding in the rotary electric machine according to Embodiment 2 of the present invention, FIG. 28 is an oblique projection that explains the assembly method for the stator in the rotary electric machine according to Embodiment 2 of the present invention, FIG. 29 is an oblique projection that explains the assembly method for the stator in the rotary electric machine according to Embodiment 2 of the present invention, and FIG. 30 is an oblique projection that shows a state in which terminals of a coil that constitutes part of a stator winding in the rotary electric machine according to Embodiment 2 of the present invention are twisted.

In FIG. 24, a stator 10A includes: an annular stator core 11A; and a stator winding 20A that is mounted to the stator core 11A.

The stator core 11A is produced by laminating and integrating electromagnetic steel sheets, and includes: an annular core back 11a; and forty-eight teeth 11b that are arranged at a uniform pitch circumferentially so as to each project radially inward from an inner circumferential wall surface of the core back 11a. Slots 13 that are formed by the core backs 11a and circumferentially adjacent teeth 11b are arranged at a uniform angular pitch circumferentially so as to be open on an inner circumferential side.

The stator winding 20A is constituted by a large number of coils 800 that function as stator winding coils that are produced by bending and shaping conductor wires 25 into U-shaped coil patterns.

The coils 800, as shown in FIGS. 25 through 27, include: first and second rectilinear portions 801 and 802 that are inserted into the slots 13 of the stator core 11A; and a first coil end portion 811 that links together first end portions of the first and second rectilinear portions 801 and 802. Spacing between the first and second rectilinear portions 801 and 802 is a pitch of six slots.

The first coil end portion 811 includes: a pair of oblique portions 811A that rise up obliquely from the first and second rectilinear portions 801 and 802; and a bulging portion 811B that bulges outward in an axial direction (a longitudinal direction of the rectilinear portions) from a top portion of the pair of oblique portions 811A. In addition, a crank portion 81C that displaces radially by a length d of the short side of the conductor wire 25 is formed on the bulging portion 811B. Furthermore, the pair of oblique portions 811A maintain radial positions that are similar or identical to those of the first and second rectilinear portions 801 and 802 at the point of rising up. In other words, the pair of oblique portions 811A have circular arc shapes that have as a radius a distance between the first and second rectilinear portions 801 and 802 at the point of rising up and a central axis of the stator core 11A when viewed from axially outside when the stator winding 20A is mounted to the stator core 11A.

A winding assembly 22 is assembled by lining up groups of the coils 800 in two layers radially, the groups being configured by arranging forty-eight coils 800 at a pitch of one slot in a circumferential direction. In the winding assembly 22 that is assembled in this manner, forty-eight columns of four first and second rectilinear portions 801 and 802 that are lined up in a single column radially are arranged circumferentially at a pitch of one slot.

Then, as shown in FIG. 28, a central axis of the winding assembly 22 is aligned with the central axis of the stator core 11A, and the winding assembly 22 is moved toward the stator core 11A from axially outside. As shown in FIG. 29, the winding assembly 22 is thereby mounted into the stator core 11A such that each of the columns of first and second rectilinear portions 801 and 802 that are lined up in a single column radially are inserted into each of the slots 13 of the stator core 11A. Next, as shown in FIG. 30, terminals of the first and second rectilinear portions 801 and 802 that extend outward from the slots 13 are each twisted circumferentially. As shown in FIG. 24, a stator 10A in which the stator winding 20A is mounted into the stator core 11A is assembled thereby. A connection process is then applied to the stator winding 20A to form a three-phase alternating-current winding. Moreover, for simplicity, the twisted state of the terminals of one coil 800 is shown in FIG. 30.

Figure 31:
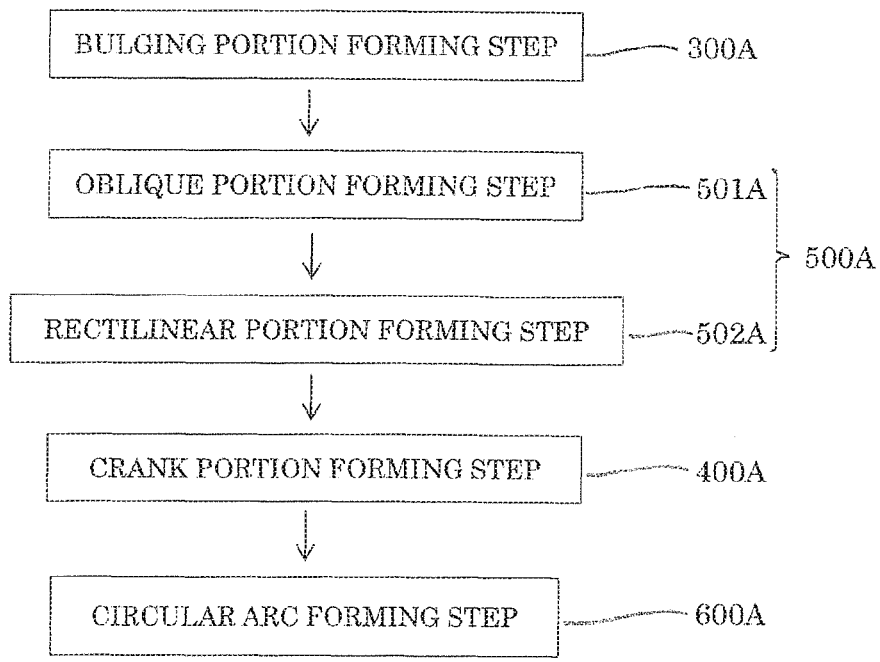
FIG. 31 is a diagram that explains flow in a manufacturing method for a stator winding coil that is used in the rotary electric machine according to Embodiment 2 of the present invention.
Figure 33:
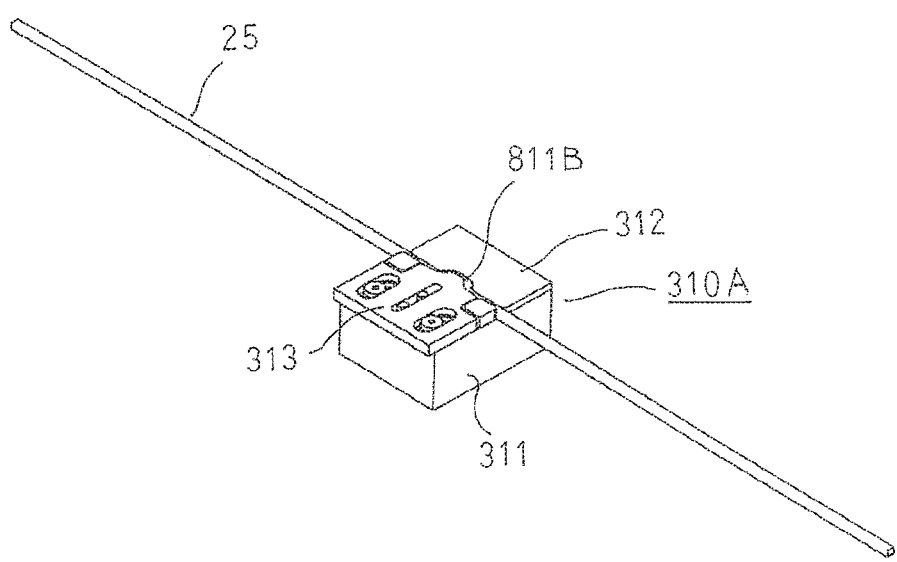
FIG. 33 is a process diagram that explains a bulging portion forming step in the manufacturing method for the stator winding coil that is used in the rotary electric machine according to Embodiment 2 of the present invention.
Figure 34A:
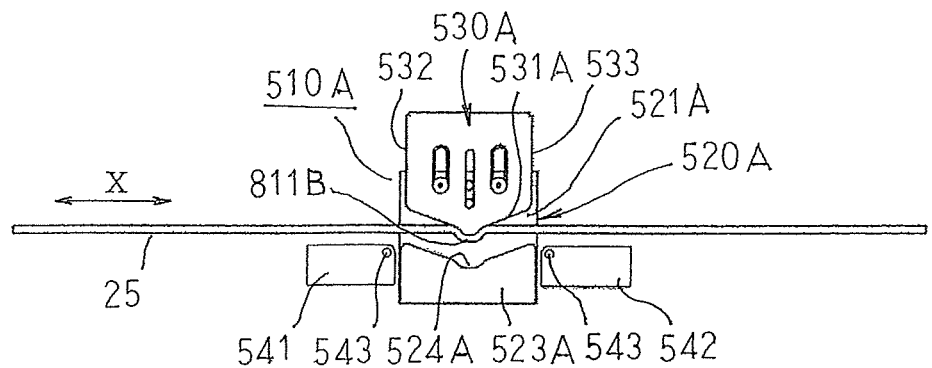
FIGS. 34A through 34C show process diagrams that explain an oblique portion and rectilinear portion forming step in the manufacturing method for the stator winding coil that is used in the rotary electric machine according to Embodiment 2 of the present invention.
Figure 34B:
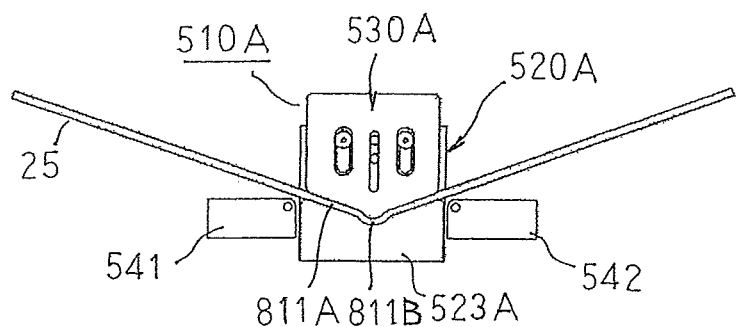
Figure 34C:
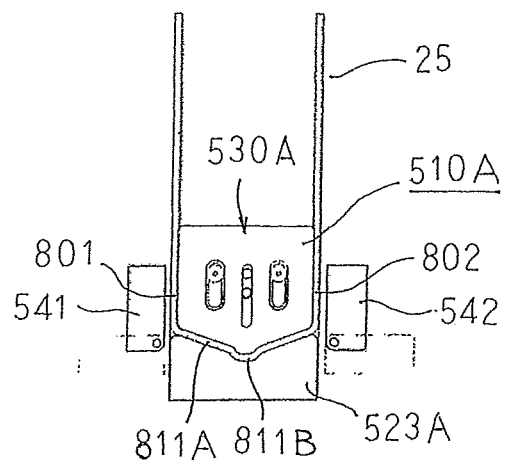
Figure 35:
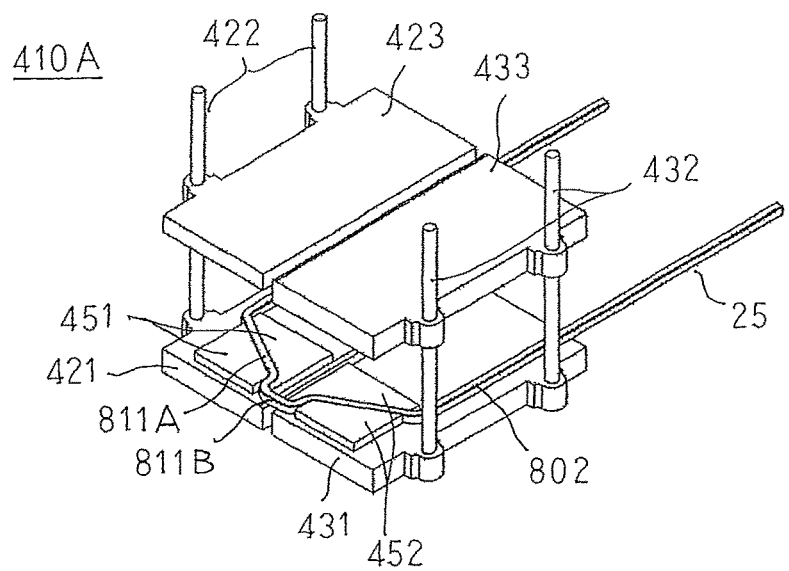
FIG. 35 is an oblique projection that shows a crank portion forming machine in the manufacturing method for the stator winding coil that is used in the rotary electric machine according to Embodiment 2 of the present invention.
Figure 36A:
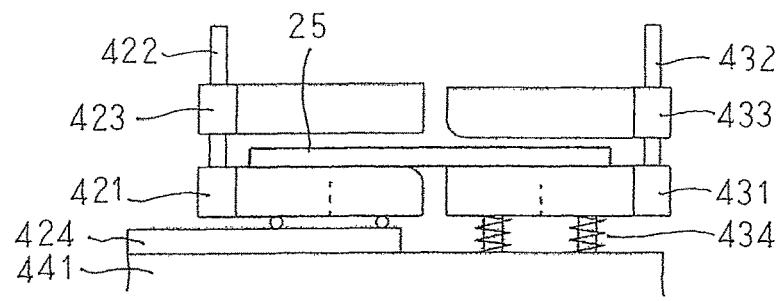
FIGS. 36A through 36C show process diagrams that explain a crank portion forming step in the manufacturing method for the stator winding coil that is used in the rotary electric machine according to Embodiment 2 of the present invention.
Figure 36B:
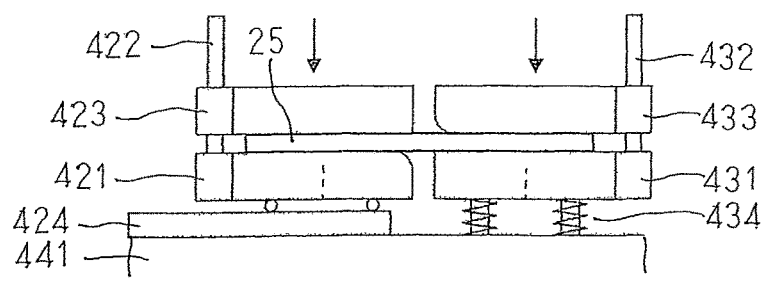
Figure 36C:
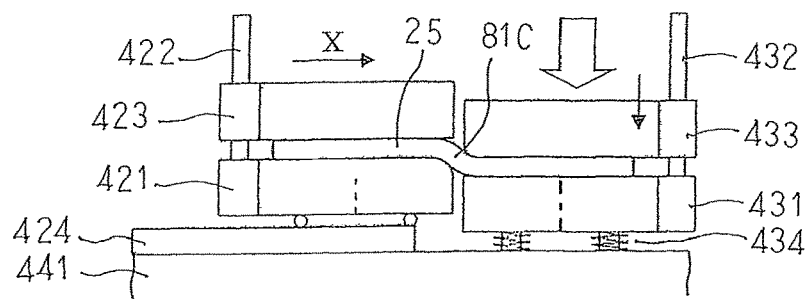
Figure 37A:
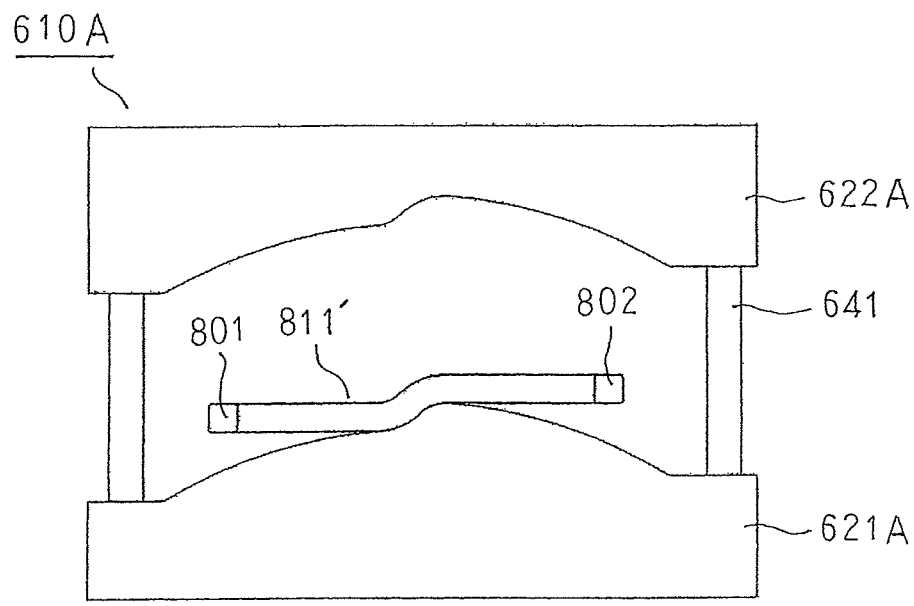
FIGS. 37A and 37B show process diagrams that explain a circular arc forming step in the manufacturing method for the stator winding coil that is used in the rotary electric machine according to Embodiment 2 of the present invention.
Figure 37B:
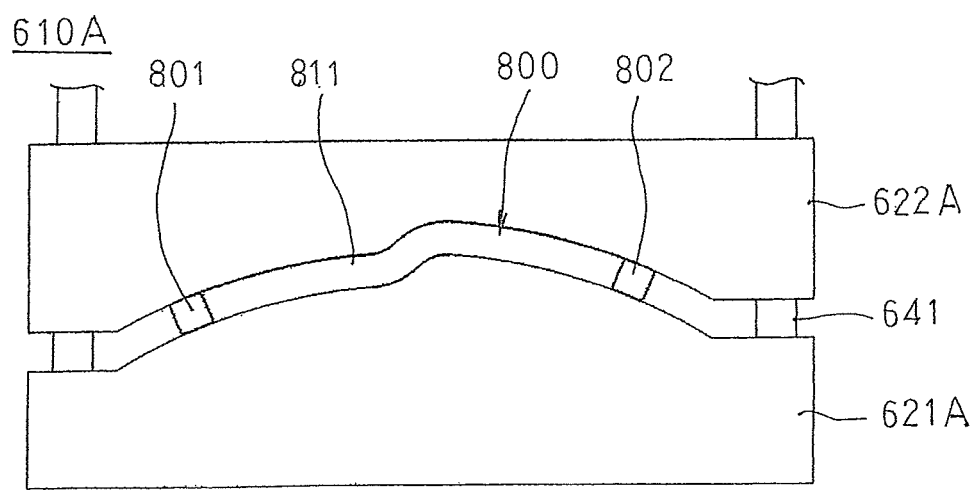

Next, the manufacturing method for the coils 800 will be explained with reference to FIGS. 31 through 37. FIG. 31 is a diagram that explains flow in a manufacturing method for a stator winding coil that is used in the rotary electric machine according to Embodiment 2 of the present invention, FIG. 32 is an oblique projection that shows a bulging portion forming machine in the manufacturing method for the stator winding coil that is used in the rotary electric machine according to Embodiment 2 of the present invention, FIG. 33 is a process diagram that explains a bulging portion forming step in the manufacturing method for the stator winding coil that is used in the rotary electric machine according to Embodiment 2 of the present invention, FIGS. 34A through 34C show process diagrams that explain an oblique portion and rectilinear portion forming step in the manufacturing method for the stator winding coil that is used in the rotary electric machine according to Embodiment 2 of the present invention, FIG. 35 is an oblique projection that shows a crank portion forming machine in the manufacturing method for the stator winding coil that is used in the rotary electric machine according to Embodiment 2 of the present invention, FIGS. 36A through 36C show process diagrams that explain a crank portion forming step in the manufacturing method for the stator winding coil that is used in the rotary electric machine according to Embodiment 2 of the present invention, and FIGS. 37A and 37B show process diagrams that explain a circular arc forming step in the manufacturing method for the stator winding coil that is used in the rotary electric machine according to Embodiment 2 of the present invention.

As shown in FIG. 31, the manufacturing method for the coils 800 includes: a bulging portion forming step 300A; an oblique portion and rectilinear portion forming step 500A (an oblique portion forming step 501A and a rectilinear portion forming step 502A); a crank portion forming step 400A; and a circular arc forming step 600A.

Figure 32:
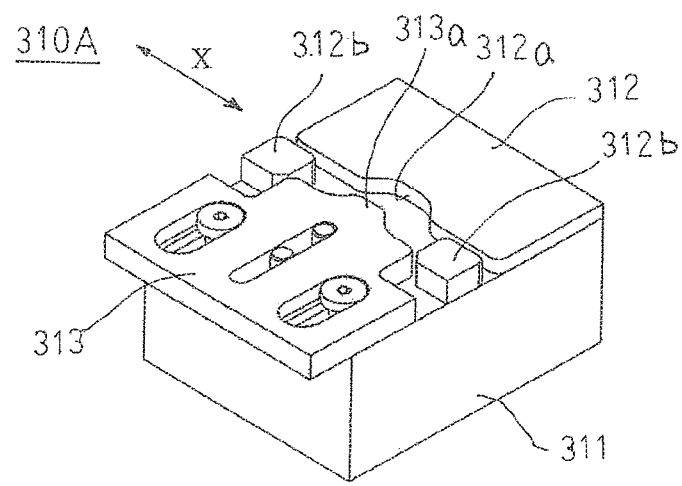
FIG. 32 is an oblique projection that shows a bulging portion forming machine in the manufacturing method for the stator winding coil that is used in the rotary electric machine according to Embodiment 2 of the present invention.

As shown in FIG. 32, a bulging portion forming machine 310A that is used in the bulging portion forming step 300A includes: a fixed base 311; a bulging portion forming die 312 that is disposed on the fixed base 311 in a fixed state; and a bulging portion forming perpendicular sliding die 313 that is installed on the bulging portion forming die 312 so as to be movable in a direction that is perpendicular to an X direction. Here, the X direction is aligned with a longitudinal direction of the conductor wire 25, i.e., a direction of feeding of the conductor wire 25.

The bulging portion forming die 312 has: a recess portion 312a that has an inner peripheral surface that conforms to an outer peripheral surface shape of the bulging portion 811B that is formed on the conductor wire 25; and a pair of guiding portions 312b that are disposed at two ends of the recess portion 312a in the X direction to guide the conductor wire 25. The bulging portion forming perpendicular sliding die 313 has a protruding portion 313a that has an outer peripheral surface that conforms to an inner peripheral surface shape of the bulging portions portion 811B that is formed on the conductor wire 25, and is installed on the bulging portion forming die 312 such that the protruding portion 313a is directed toward the recess portion 312a so as to be able to approach and be separated from the recess portion 312a.

In the bulging portion forming step 300A, the protruding portion 313a of the bulging portion forming perpendicular sliding die 313 recedes to a position that is separated from the recess portion 312a. Then, the rectilinear conductor wire 25 is set in the bulging portion forming machine 310A such that the longitudinal direction of the short sides of the oblong cross section is perpendicular to the X direction and the direction of movement of the bulging portion forming perpendicular sliding die 313. Next, as shown in FIG. 33, the bulging portion forming perpendicular sliding die 313 is operated such that the protruding portion 313a moves toward the recess portion 312a. The conductor wire 25 is thereby clamped between the recess portion 312a and the protruding portion 313a to form the bulging portion 811B.

As shown in FIG. 34A, an oblique portion and rectilinear portion forming machine 510A includes: a fixed die 520A; a movable die 530A that forms oblique portions by bending; and bending portions 541 and 542 that form rectilinear portions by bending. An upper surface 521A of the fixed die 520A is formed so as to have a flat shape, and a receiving portion 523A is disposed on the upper surface 521A. The receiving portion 523A has a receiving surface 524A that is formed so as to have a surface shape that conforms to an outer peripheral surface shape of a coil end portion on which the bulging portion and the oblique portions are formed. The movable die 530A has: a pressing surface 531A that conforms to an inner peripheral surface shape of a coil end portion on which the bulging portion and the oblique portions are formed; and rectilinear portion receiving surfaces 532 and 533 that extend in a direction that is perpendicular to the X direction from two ends of the pressing surface 531A. The movable die 530A is installed on the upper surface 521A of the fixed die 520A such that the pressing surface 531A faces toward the receiving surface 524A so as to be able to approach and separate from the receiving portion 523A. The bending portions 541 and 542 are mounted to the fixed die 520A so as to be pivotable around pins 543 so as to be separated from the two ends of the receiving surface 524A of the receiving portion 523A in the X direction.

In the oblique portion and rectilinear portion forming step 500A, as shown in FIG. 34A, the intermediate conductor wire 252 is fed in the X direction so as to position the intermediate conductor wire 252 such that the bulging portion 811B matches a top portion of the pressing surface 531A. Next, as shown in FIG. 34B, the movable die 530A is moved toward the receiving portion 523A. The bulging portion 811B of the conductor wire 25 and the portions at two ends thereof are thereby clamped between the pressing surface 531A and the receiving surface 524A to form the oblique portions 811A at the two ends of the bulging portion 811B (the oblique portion forming step 501A). Next, the bending portions 541 and 542 are pivoted around the pins 543, as shown in FIG. 34C. Portions of the intermediate conductor wire 252 that extend from the oblique portions 811A are thereby clamped between the rectilinear portion receiving surfaces 532 and 533 and the bending portions 541 and 542 to form the first rectilinear portion 801 and the second rectilinear portion 802 on two ends of the oblique portions 811A (the rectilinear portion forming step 502A).

As shown in FIGS. 34B and 34C, the pair of oblique portions 811A and the first and second rectilinear portions 801 and 802 are formed on the conductor wire 25 thereby, using the bulging portion 811B of the conductor wire 25 as a reference point.

As shown in FIG. 35, a crank portion forming machine 410A includes: a first holding member 421 on a first surface of which are installed first holding portions 451 that hold the oblique portion 811A at the first end of the conductor wire 25 from opposite sides, and that restrict movement of the conductor wire 25 in the longitudinal direction (the X direction) by contacting an inner peripheral surface of a raised portion at the first end of the bulging portion 811B; and a first pressing plate 423 that is installed so as to be able to reciprocate vertically so as to be guided by supporting posts 422 that are erected on a first surface of the first holding member 421; a second holding member 431 on a first surface of which is installed second holding portions 452 that hold an oblique portion 811A at the second end of the conductor wire 25 from opposite sides, and that restrict movement of the conductor wire 25 in the X direction by contacting an inner peripheral surface of a raised portion at the second end of the bulging portion 811B; and a second pressing plate 433 that is installed so as to be able to reciprocate vertically so as to be guided by supporting posts 432 that are erected on a first surface of the second holding member 431.

As shown in FIG. 36A, the first holding member 421 is disposed so as to be guided by rails 424 that are installed on a base 441 so as to be movable in the X direction. As shown in FIG. 36A, the second holding member 431 is installed on the base 441 so as to be positioned at the second end of the first holding member 421 in the X direction so as to have spring members 434 interposed. The spring members 434 are produced such that the first surface of the second holding member 431 is flush with the first surface of the first holding member 421 in an unloaded state. Here, the second holding member 431, the second pressing plate 433, and the second holding portions 452 constitute a first metal die, and the first holding member 421, the first pressing plate 423, and the first holding portions 451 constitute a second metal die.

In the crank portion forming step 400A, as shown in FIGS. 35 and 36A, the conductor wire 25 is set in the crank portion forming machine 410A such that the oblique portion 811A at the first end is inserted between the first holding portions 451, and the oblique portion 811A at the second end is inserted between the second holding portions 452. Next, the first pressing plate 423 is lowered until it contacts the first holding portions 451. The conductor wire 25 is thereby held by the first holding member 421 and the first pressing plate 423.

Next, as shown in FIG. 36B, the second pressing plate 433 is lowered until it contacts the second holding portions 452. The conductor wire 25 is thereby held by the second holding member 431 and the second pressing plate 433. Next, the second pressing plate 433 is pressed downward, as shown in FIG. 36C. The spring members 434 are compressed thereby, and the second holding member 431 and the second pressing plate 433 descend to form the crank portion 81C on the bulging portion 811B. Here, the first holding member 421 and the first pressing plate 423 that are holding the conductor wire 25 are guided by the rails 424 so as to move toward the second holding member 431 and the second pressing plate 433. Stretching of the bulging portion 811B during crank portion formation is thereby suppressed, suppressing the occurrence of thinning and damage to the insulating coating on the conductor wire 25.

As shown in FIG. 37A, a circular arc forming machine 610A includes dies 621A and 622A that have pressing surfaces that are constituted by portions of cylindrical surfaces. The die 622A is mounted such that a pressing surface thereof faces a pressing surface of the die 621A so as to be able to move vertically so as to be guided by guiding pins 641 that are erected on the die 621A. Then the conductor wire 25 is set in the circular arc forming machine 610A such that a rectilinear coil end portion 811' that includes the oblique portions 811A and the bulging portion 811B is inserted between the pressing surfaces of the dies 621A and 622A. Then, as shown in FIG. 37B, the die 622A is lowered using the guiding pins 641 as guides. The oblique portions 811A of the coil end portion 811' are thereby clamped between the die 621A and 622A to form circular arc shapes, producing the coil 800 that is shown in FIGS. 25 through 27.

According to Embodiment 2, formation of bulging portions (the bulging portion forming step 300A), formation of oblique portions (the oblique portion forming step 501A), formation of rectilinear portions (the rectilinear portion forming step 502A), formation of crank portions (the crank portion forming step 400A), and formation of circular arcs (the circular arc forming step 600A) are each performed in dedicated steps. Thus, simplification of configuration and reductions in the size of the forming machines that are used in each of the steps are enabled, enabling manufacturing equipment costs to be reduced. Machining force for formation in each of the steps is also reduced, enabling the occurrence of damage to the insulating coatings that is coated onto the conductor wire to be suppressed, thereby enabling insulation to be improved.

Because the pair of oblique portions 811 and the first and second rectilinear portions 801 and 802 are formed in the oblique portion forming step 501A and the rectilinear portion forming step 502A using a bulging portion 811B as a reference point, the coils 800 can be produced with high dimensional precision.

In the crank portion forming step 400A, the first holding member 421 and the first pressing plate 423, which hold the oblique portion 811A at the first end of the conductor wire 25, are configured so as to be movable toward the second holding member 431 and the second pressing plate 433, which hold the oblique portion 811A at the second end of the conductor wire 25, and the second holding member 431 and the second pressing plate 433, which hold the oblique portion 811A at the second end of conductor wire 25, are configured so as to be movable only vertically. Thus, when the second holding member 431 and the second pressing plate 433 are lowered to form the crank portions 81C, the first holding member 421 and the first pressing plate 423 are displaced toward the second holding member 431 and the second pressing plate 433, enabling stretching of the bulging portion during crank portion formation to be suppressed. The occurrence of thinning and damage to the insulating coating on the conductor wire 25 is thereby suppressed.

Now, in Embodiment 2, the crank portion forming step 400A is performed after the rectilinear portion forming step 502A, but the crank portion forming step 400A may be performed before the oblique portion forming step 501A.

Moreover, in each of the above embodiments, the coils are produced using conductor wire that has an oblong cross section, but the cross sectional shape of the conductor wire that constitutes the coils is not limited to an oblong shape, and conductor wire that has a circular cross section may be used, for example.

In each of the above embodiments, the coils are produced by winding rectangular conductor wires into edgewise windings, but coils may be produced by winding rectangular conductor wires into flatwise windings.

In each of the above embodiments, an eight-pole forty-eight-slot rotary electric machine has been explained, but it goes without saying that the number of poles and the number of slots are not limited to eight poles and forty-eight slots. Furthermore, the slots are formed at a ratio of two slots per phase per pole, but the number of slots per phase per pole is not limited to two, and may be one, or may be three or greater.

The invention claimed is:
1. A manufacturing method for a stator winding coil that is formed into a U shape, the stator winding coil including
    two rectilinear portions that are configured to be inserted into two slots that are formed on a stator core such that longitudinal directions thereof are oriented in an axial direction and
    a coil end portion that links together end portions of said two rectilinear portions,
    wherein said manufacturing method comprises:
    coating a jointless continuous conductor wire with insulation;
    forming a bulging portion on the jointless continuous conductor wire;
    forming oblique portions on said conductor wire at two longitudinal ends of said bulging portion;

forming the two rectilinear portions on said conductor wire at opposite ends of said oblique portions from said bulging portion, the bulging portion being formed at a central portion between the two rectilinear portions and a pair of oblique portions linking the two linked rectilinear portions and the bulging portion;

forming a crank portion on a central position of said bulging portion after forming said two rectilinear portions, the crank portion displacing radial positions of the two linked rectilinear portions by a set amount at the central position; and forming said oblique portions into a circular arc shape that is centered around a central axis of the stator core after forming said two rectilinear portions, wherein forming said crank portion includes holding a portion of said conductor wire at a first end of said bulging portion in a direction that is perpendicular to a direction of displacement of said crank portion by a first metal die that enables movement in said direction of displacement of said crank portion, and holding a portion of said conductor wire at a second end of said bulging portion in a direction that is perpendicular to a direction of displacement of said crank portion by a second metal die that enables movement in said direction that is perpendicular to said direction of displacement of said crank portion, and then forming said crank portion by moving said second metal die toward said first end in said direction that is perpendicular to said direction of displacement of said crank portion while moving said first metal die in said direction of displacement of said crank portion.

2. The manufacturing method for a stator winding coil according to claim 1, further comprising:

forming said oblique portions and said rectilinear portions using said bulging portion as a reference point.

* * * * *